(12) United States Patent
Ishihara et al.

(10) Patent No.: US 7,649,297 B2
(45) Date of Patent: Jan. 19, 2010

(54) COMMUTATOR, DIRECT-CURRENT MOTOR, AND METHOD FOR MANUFACTURING COMMUTATOR

(75) Inventors: Hidenori Ishihara, Hamamatsu (JP); Hideyuki Suzuki, Toyohashi (JP); Katsuhiko Torii, Kosai (JP); Hiroaki Yamamoto, Toyohashi (JP); Tomoki Yamashita, Hamamatsu (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 12/146,877

(22) Filed: Jun. 26, 2008

(65) Prior Publication Data

US 2009/0001832 A1    Jan. 1, 2009

(30) Foreign Application Priority Data

Jun. 27, 2007    (JP)    ............................. 2007-169280

(51) Int. Cl.
*H02K 27/02* (2006.01)
*H01R 39/06* (2006.01)

(52) U.S. Cl. ...................... 310/237; 310/233; 310/234; 310/71

(58) Field of Classification Search ................. 310/128, 310/233, 234, 237, 71
See application file for complete search history.

(56) References Cited

U.S. PATENT DOCUMENTS

2007/0069603 A1    3/2007    Terada et al.

2007/0170807 A1*    7/2007    Nakano et al. ............... 310/237

FOREIGN PATENT DOCUMENTS

JP    2005-137193 A    5/2005
JP    2008-054397 A    3/2008

* cited by examiner

*Primary Examiner*—Quyen Leung
*Assistant Examiner*—Leda Pham
(74) *Attorney, Agent, or Firm*—Marsh Fischmann & Breyfogle LLP

(57) ABSTRACT

A commutator having a plurality of segments, a short-circuit member assembly, a holding portion, and a plurality of spacing members is disclosed. The short-circuit member assembly includes a plurality of short-circuit pieces. Each short-circuit piece has an outer terminal, an inner terminal arranged radially inward from the outer terminal and circumferentially offset from the outer terminal at a predetermined offset angle, and a connecting portion connecting the inner terminal to the outer terminal. The holding portion covers the segments and at least a portion of the short-circuit member assembly to hold the segments and the short-circuit member assembly. The spacing members each have an insulated support portion and a plurality of insulated spacing projections formed integrally with the support portion. Each support portion extends in a radial direction of the short-circuit member assembly. The spacing projections are arranged in the direction in which the corresponding support members extend in such a manner that the spacing projections are each provided between the corresponding circumferentially adjacent pair of the connecting portions.

15 Claims, 12 Drawing Sheets

COMMUTATOR, DIRECT-CURRENT MOTOR, AND METHOD FOR MANUFACTURING COMMUTATOR

BACKGROUND OF THE INVENTION

The present invention relates to a commutator with a short-circuit member assembly, a direct-current motor having the commutator, and a method for manufacturing the commutator.

Typically, in order to reduce a direct-current motor in size, it is desired that the size of a commutator provided in an armature of the motor be decreased. For example, Japanese Laid-Open Patent Publication No. 2005-137193 discloses a direct-current motor that decreases the axial dimension of a commutator by using a short-circuit member assembly configured by two groups of flat plate-like short-circuit pieces, which are stacked together in the axial direction of the commutator.

Each of the two groups of the short-circuit pieces of the aforementioned publication includes a plurality of short-circuit pieces that are arranged in the same plane. Each short-circuit piece includes an outer terminal, an inner terminal, and a connecting portion. The outer terminal is located radially outward. The inner terminal is arranged radially inward from the outer terminal and circumferentially offset from the outer terminal at a predetermined angle toward one side. The connecting portion connects the outer terminal to the inner terminal. A plurality of segments are circumferentially arranged around the outer circumference of the commutator. The number of the outer terminals of each the short-circuit piece group is equal to the number of the segments. The outer terminals of each short-circuit piece group are each electrically connected to the corresponding one of the segments. The two short-circuit piece groups are stacked together in such a manner that the connecting portions of one of the short-circuit piece groups extend across the connecting portions of the other the short-circuit piece group, as viewed axially. The outer terminals of one of the short-circuit piece groups contact the outer terminals of the other the short-circuit piece groups. The inner terminals of one of the short-circuit piece groups contact the inner terminals of the other the short-circuit piece group. The connecting portions of one of the short-circuit piece groups and the connecting portions of the other the short-circuit piece group are mutually spaced in the stacking direction of the two groups and thus held in mutual non-contact states. Insulating members formed of insulating resin material are each arranged between each circumferentially adjacent pair of the connecting portions of each short-circuit piece group. Each insulating member prevents short circuit between the corresponding circumferentially adjacent pair of the connecting portions.

To manufacture the short-circuit member assembly of the aforementioned document, the two short-circuit piece groups are placed in a mold while held in the stacked state. Then, the insulating resin material in a molten state is poured into the mold to shape the insulating members. However, since each connecting portion is elongated, the connecting portions are deformed by molding pressure acting on the connecting portions when the insulating members are shaped. Such deformation may cause short-circuit in the corresponding circumferentially adjacent pair of the connecting portions.

SUMMARY OF THE INVENTION

Accordingly, it is an objective of the present invention to provide a commutator that ensures insulation between each circumferentially adjacent pair of connecting portions, a direct-current motor with the commutator, and a method for manufacturing the commutator.

To achieve the foregoing objective and in accordance with a first aspect of the present invention, a commutator including a plurality of segments, a substantially disk-like short circuit member assembly, a holding portion, and a plurality of spacing members is provided. The segments are arranged in a circumferential direction. Each segment has a slidable contact surface that a feeder brush slidably contacts. The short-circuit member assembly has a first end surface and a second end surface that face in opposite directions. The short-circuit member assembly includes a group of short-circuit pieces. The group includes a plurality of short-circuit pieces that are arranged in a circumferential direction to form a disk-like shape as a whole. Each short-circuit piece has an outer terminal, an inner terminal arranged radially inward from the outer terminal and circumferentially offset from the outer terminal at a predetermined offset angle, and a connecting portion connecting the inner terminal to the outer terminal. Each segment is connected to at least one of the outer terminal and the inner terminal so that each pair of the segments that are to have equal potentials are short-circuited. The holding portion covers the segments and at least a portion of the short-circuit member assembly to hold the segments and the short-circuit member assembly. The holding portion is formed of an insulating resin material. The spacing members each have an insulated support portion and a plurality of insulated spacing projections formed integrally with the support portion. Each support portion extends along the first end surface or the second end surface in a radial direction of the short-circuit member assembly. The spacing projections are arranged in the direction in which the corresponding support members extend in such a manner that the spacing projections are each provided between the corresponding circumferentially adjacent pair of the connecting portions.

In accordance with a second aspect of the present invention, a direct-current motor including a plurality of magnets arranged in a circumferential direction, an armature opposed to the magnet, and a feeder brush is provided. The armature includes a rotary shaft, an armature core fixed to the rotary shaft and having a coil wound around the armature, and the commutator according to the first aspect of the present invention fixed to the rotary shaft. The feeder brush slidably contacts the commutator.

In accordance with a third aspect of the present invention, a commutator including a plurality of segments, a substantially disk-like short-circuit member, a holding portion, and at least one spacing member is provided. The segments are arranged in a circumferential direction. Each segment has a slidable contact surface that a feeder brush slidably contacts. The short-circuit member assembly has a first end surface and a second end surface that face in opposite directions. The short-circuit member assembly includes a group of short-circuit pieces. The group includes a plurality of short-circuit pieces that are arranged in a circumferential direction to form a disk-like shape as a whole. Each short-circuit piece has an outer terminal, an inner terminal arranged radially inward from the outer terminal and circumferentially offset from the outer terminal at a predetermined offset angle, and a connecting portion connecting the inner terminal to the outer terminal. Each segment is connected to at least one of the outer terminal and the inner terminal so that each pair of the segments that are to have equal potentials are short-circuited. The holding portion covers the segments and at least a portion of the short-circuit member assembly to hold the segments and the short-circuit member assembly. The holding portion is formed of an insulating resin material. The spacing member has an insulated support portion and a plurality of insulated spacing projections formed integrally with the support portion. The support portion extends along the first end surface or the second end surface in a circumferential direction of the short-circuit member assembly. The spacing projections are arranged in the circumferential direction of the short-circuit member assembly in such a manner that the spacing projections are each provided between the corresponding circumferentially adjacent pair of the connecting portions.

In accordance with a fourth aspect of the present invention, a direct-current motor including a plurality of magnets arranged in a circumferential direction, an armature opposed to the magnets, and a feeder brush is provided. The armature includes a rotary shaft, an armature core fixed to the rotary shaft and having a coil wound around the armature, and the commutator according to the third aspect of the present invention fixed to the rotary shaft. The feeder brush slidably contacts the commutator.

In accordance with a fifth aspect of the present invention, a commutator including a plurality of segments, a substantially disk-like short-circuit member assembly, a holding portion, at least one first spacing member, and at least one second spacing member is provided. The segments are arranged in a circumferential direction. Each segment has a slidable contact surface that a feeder brush slidably contacts. The short-circuit member assembly has a first end surface and a second end surface that face in opposite directions. The short-circuit member assembly includes a group of short-circuit pieces. The group includes a plurality of short-circuit pieces that are arranged in a circumferential direction to form a disk-like shape as a whole. Each short-circuit piece has an outer terminal, an inner terminal arranged radially inward from the outer terminal and circumferentially offset from the outer terminal at a predetermined offset angle, and a connecting portion connecting the inner terminal to the outer terminal. Each segment is connected to at least one of the outer terminal and the inner terminal so that each pair of the segments that are to have equal potentials are short-circuited. The holding portion covers the segments and at least a portion of the short-circuit member assembly to hold the segments and the short-circuit member assembly. The holding portion is formed of an insulating resin material. The first spacing member has a first insulated support portion provided on the first end surface and a plurality of first insulated spacing projections formed integrally with the first support portion in such a manner that the first spacing projections are each located between the corresponding circumferentially adjacent pair of the connecting portions. The second spacing member has a second insulated support portion that is provided on the second end surface and shaped differently from the first support portion and a plurality of second insulated spacing projections formed integrally with the second support portion in such a manner that the second spacing projections are each located between the corresponding circumferentially adjacent pair of the connecting portions.

In accordance with a sixth aspect of the present invention, a direct-current motor including a plurality of magnets arranged in a circumferential direction, an armature opposed to the magnets, and a feeder brush is provided. The armature includes a rotary shaft, an armature core fixed to the rotary shaft and having a coil wound around the armature, and the commutator according to the fifth aspect of the present invention fixed to the rotary shaft. The feeder brush slidably contacts the commutator.

In accordance with a seventh aspect of the present invention, a method for manufacturing a commutator is provided.

The method includes: preparing a conductive plate material; forming a plurality of slits in the plate material in such a manner that the slits extend diagonally with respect to a radial direction of a circle to form a disk-like shape as a whole, thereby providing a short-circuit member assembly having a plurality of short-circuit pieces that are arranged in a circumferential direction to form a disk-like shape as a whole, each short-circuit piece having an outer terminal, an inner terminal located radially inward from the outer terminal and circumferentially offset from the outer terminal at a predetermined offset angle, and a connecting portion connecting the inner terminal to the outer terminal, a portion of the plate material located radially outward from the slits forming an outer connecting portion that connects the outer terminals mutually, a portion of the plate material located radially inward from the slits forming an inner connecting portion that connects the inner terminals mutually; forming a spacing member integrally with the plate material, the spacing member having, in an integral manner, an insulated support portion formed on at least one of the surfaces of the plate material and a plurality of insulated spacing projections located between each adjacent pair of the slits; removing the outer connecting portion and the inner connecting portion from the plate material with which the spacing member is formed integrally, thereby separating the outer terminals and the inner terminals from one another; forming a segment forming member having a shape formed by a plurality of segments that are arranged in the circumferential direction and connected together to form an annular shape as a whole; arranging the short-circuit member assembly in the segment forming member in such a manner that each segment contacts at least one of the outer terminal and the inner terminal; joining each segment with the at least one of the outer terminal and the inner terminal that contacts the segment; forming a holding portion that covers the segment forming member and at least a portion of the short-circuit member assembly to hold the segment forming member and the short-circuit member assembly; and radially cutting a portion between each circumferentially adjacent pair of the segments of the segment forming member with the segment forming member held by the holding portion.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An embodiment of the present invention will now be described with reference to the attached drawings.

Figure 1:
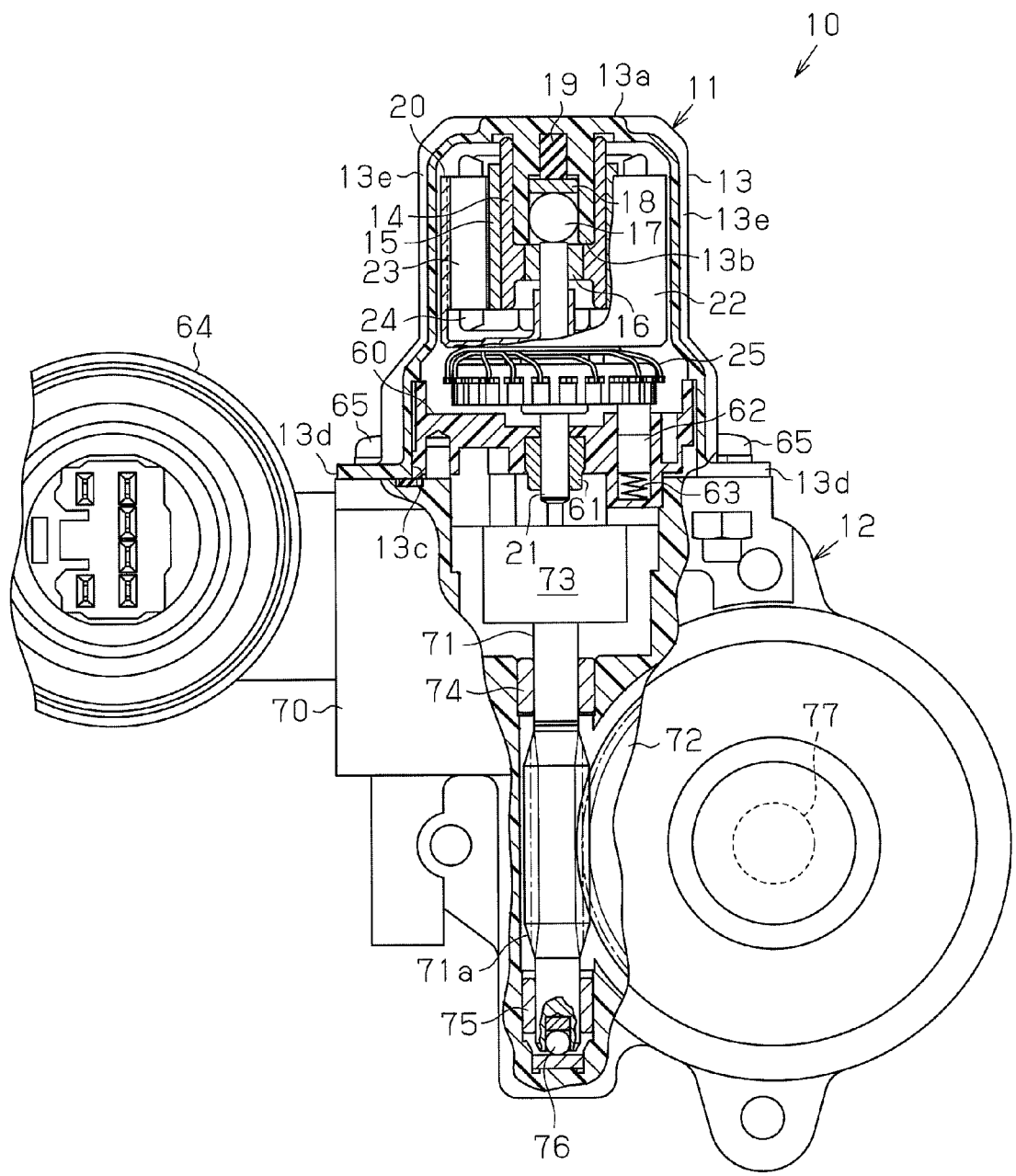
FIG. 1 is a view schematically showing a motor according to a first embodiment of the present invention.

A motor 10, which is shown in FIG. 1, is used as the drive source for a power window device that selectively opens and closes a window glass of a vehicle. The motor 10 is an outer rotor type direct-current motor, with an armature core 20 arranged around magnets 15. The motor 10 includes a motor portion 11 and a decelerating portion 12, which outputs rotation of the motor portion 11 in a decelerated state.

Figure 2:
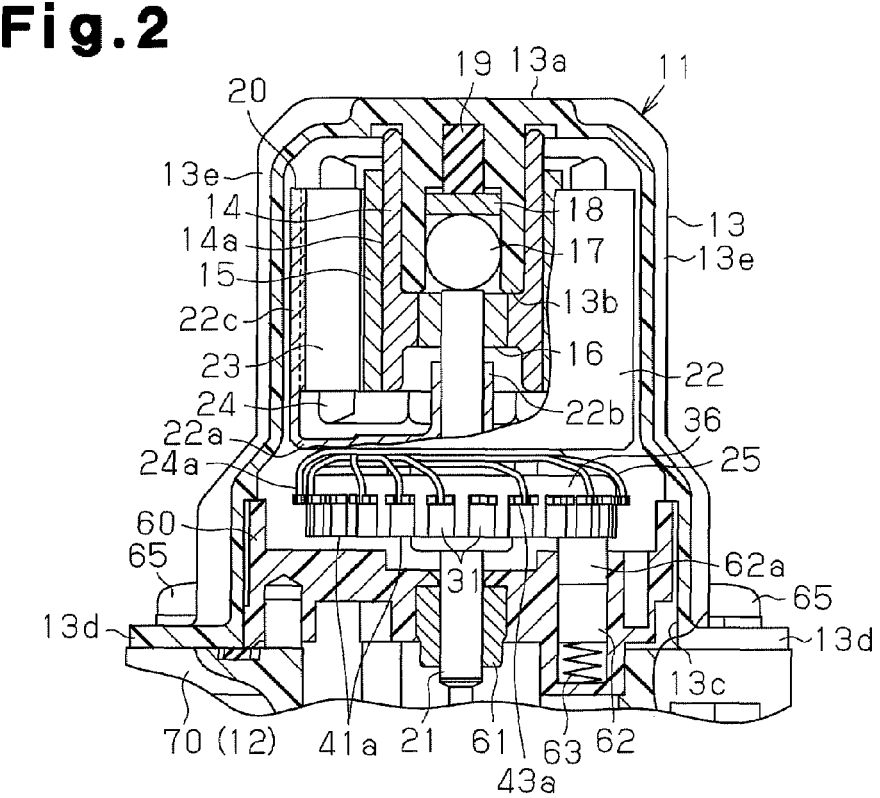
FIG. 2 is a cross-sectional view showing a motor portion of the motor shown in FIG. 1.
Figure 4:
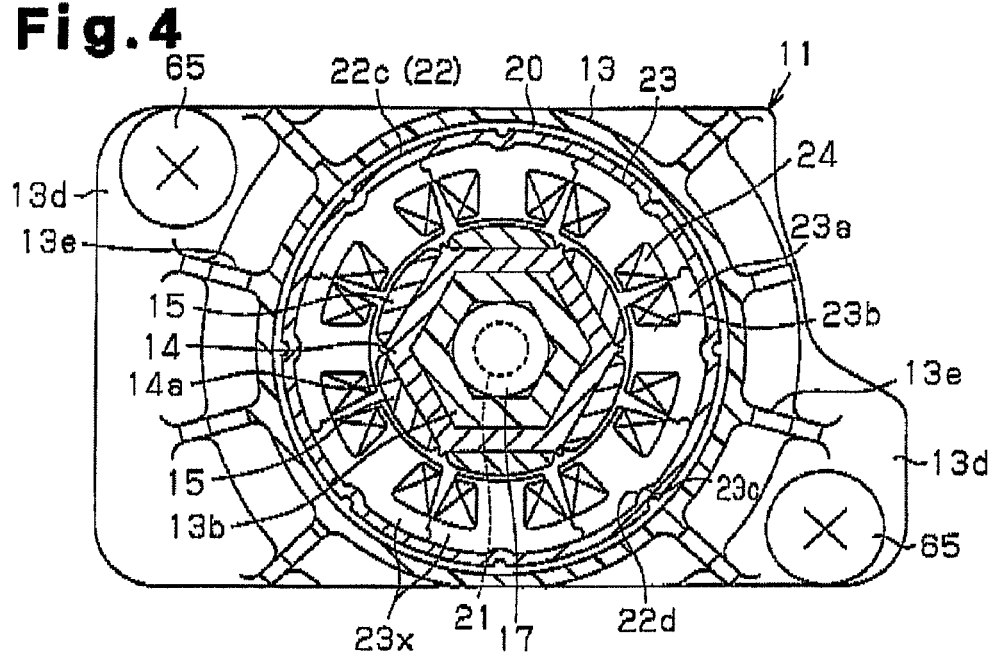
FIG. 4 is a cross-sectional view showing the motor portion illustrated in FIG. 2 as viewed in a direction perpendicular to the axis of the motor portion.

As shown in FIGS. 2 and 4, the motor portion 11 has a cylindrical motor housing 13 having a bottom 13a. The motor housing 13 is formed of resin material. A cylindrical support portion 13b is formed integrally with the motor housing 13 at the center of the bottom 13a and extends along the axial direction of the housing 13 from the inner surface of the bottom 13a. The axial length of the cylindrical support portion 13b is approximately one third of the axial length of the motor housing 13. As shown in FIG. 4, the cylindrical support portion 13b has a hexagonal cylindrical shape. A hexagonal cylindrical yoke 14 is arranged at the outer side of the cylindrical support portion 13b. The yoke 14 is formed of magnetic metal.

The axial length of the yoke 14 is approximately a half of the axial length of the motor housing 13. A portion of the yoke 14 projects from the cylindrical support portion 13b. The yoke 14 has six flat outer surfaces 14a. A magnet 15 is secured to each of the outer surfaces 14a. The inner surface of each magnet 15, which is secured to the corresponding one of the outer surfaces 14a of the yoke 14, is shaped as a flat surface corresponding to the outer surface 14a of the yoke 14. The outer surface of each magnet 15 is shaped as a curved surface in such a manner that the outer surfaces of the six magnets 15 as a whole substantially form a single circle. Each magnet 15 of the illustrated embodiment is a rare earth magnet with intense magnetic force in spite of its small size. The magnets 15 are thus particularly preferable for use in the motor 10 of the illustrated embodiment, which is the outer rotor type.

A radial bearing 16 is secured to the inner circumferential surface of the portion of the yoke 14 projecting from the cylindrical support portion 13b. The radial bearing 16 contacts the outer circumferential surface of a proximal portion of a rotary shaft 21 of an armature 20 and thus supports the proximal portion of the rotary shaft 21 in a radial direction. A ball 17 serving as a thrust bearing is received in the space in the cylindrical support portion 13b. The ball 17 contacts a proximal surface of the rotary shaft 21, specifically, in a point contact manner, and supports the proximal portion of the rotary shaft 21. In other words, the bearing 16 rotatably supports the proximal portion of the rotary shaft 21 while the ball 17 receives thrust load acting on the rotary shaft 21. A metal plate 18 and a thrust adjustment member 19 are accommodated in the space in the cylindrical support portion 13b at positions closer to the bottom than the ball 17. The thrust adjustment member 19 is formed of elastic material and arranged behind the plate 18. The thrust adjustment member 19 applies elastic force to the ball 17 through the plate 18 to prevent the rotary shaft 21 from becoming unstable in the axial direction.

A cylindrical fixing collar 22 is fixed to an axial middle portion of the rotary shaft 21 to fix the rotary shaft 21 to an armature core 23. The fixing collar 22 has a cylindrical portion 22c and a bottom 22a, which is arranged at an axial end of the cylindrical portion 22c. The collar 22 has an opening faced to the bottom 13a of the motor housing 13. The fixing collar 22 is formed of non-magnetic material such as stainless steel. A fixing portion 22b is provided at the center of the bottom 22a of the fixing collar 22 and extends axially toward the opening of the collar 22. The rotary shaft 21 is pressed into the fixing portion 22b in such a manner that the fixing collar 22 is rotatable integrally with the rotary shaft 21.

The armature core 23 is secured to the inner circumferential surface of the cylindrical portion 22c of the fixing collar 22. The armature core 23 is configured by stacking a plurality of core materials formed by metal magnetic plates. As shown in FIG. 4, the armature core 23 has an annular outer ring portion 23a and a plurality of teeth 23b, each of which extends radially inward from the outer ring portion 23a. Specifically, eight teeth 23b are spaced at regular intervals in the circumferential direction. A coil 24 is wound around each tooth 23b.

In the present embodiment, the outer ring portion 23a is divided into a plurality of divided cores 23x at positions between each circumferentially adjacent pair of the teeth 23b.

The divided cores 23x are provided in such a manner that each adjacent pair of the divided cores 23x are rotatably connected to each other. To wind the coil 24 around each tooth 23b, the divided cores 23x are aligned along a line in such a manner that the distal ends, or the radially inner ends, of each adjacent pair of the divided cores 23x are spaced from each other by a great distance. Alternatively, the divided cores 23x are arranged substantially in an annular shape in such a manner that the teeth 23b face radially outward. Such arrangement facilitates winding of the coils 24 around the teeth 23b. When such winding is completed, the divided cores 23x are arranged in an annular shape in such a manner that the teeth 23b are located radially inward from the outer ring portion 23a. In this state, the outer ring portion 23a of the armature core 23 is secured to the inner circumferential surface of the cylindrical portion 22c of the fixing collar 22.

A plurality of (eight, in the present embodiment) positioning recesses 23c are defined in the outer circumferential end of the outer ring portion 23a and spaced at equal intervals in the circumferential direction. A plurality of (in the present embodiment, eight) positioning projections 22d are formed on the inner circumferential surface of the cylindrical portion 22c of the fixing collar 22 and spaced at equal intervals in the circumferential direction. The positioning projections 22d are engaged with the corresponding recesses 23c to position the armature core 23 relative to the fixing collar 22 in the circumferential direction. This prevents the armature core 23 from displacing relative to the fixing collar 22. The armature core 23, which is fixed to the rotary shaft 21 through the fixing collar 22, radially opposes the magnets 15.

Figure 5A:
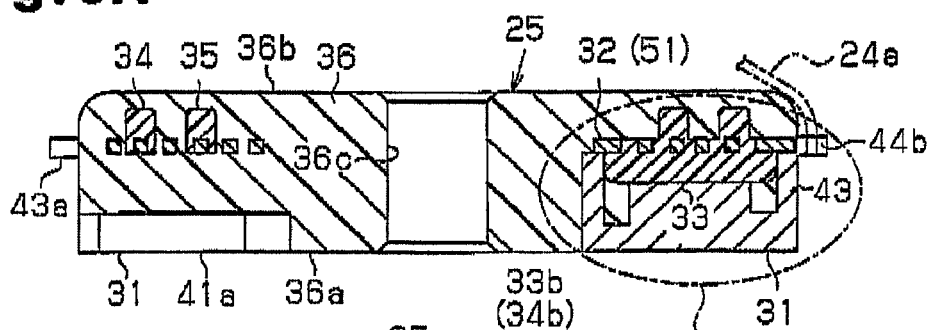
FIG. 5A is a cross-sectional view taken along line 5A-5A, showing a commutator illustrated in FIG. 6.

A flat plate-like commutator 25 is secured to the rotary shaft 21 at a position closer to the distal end than the fixing collar 22. As shown in FIG. 5A, the commutator 25 has twenty-four segments 31 that are arranged in the circumferential direction and a flat plate-like short-circuit member assembly 32 that short-circuits each prescribed pair of the segments 31 to each other. The commutator 25 also includes first spacing members 33, a second spacing member 34, and a second spacing member 35 that are provided with respect to the short-circuit member assembly 32. The commutator 25 further has a holding portion 36 that holds the segments 31 and the short-circuit member assembly 32. FIG. 5A is a cross-sectional view of the commutator 25 taken along line 5A-5A of FIG. 6.

Figure 6:
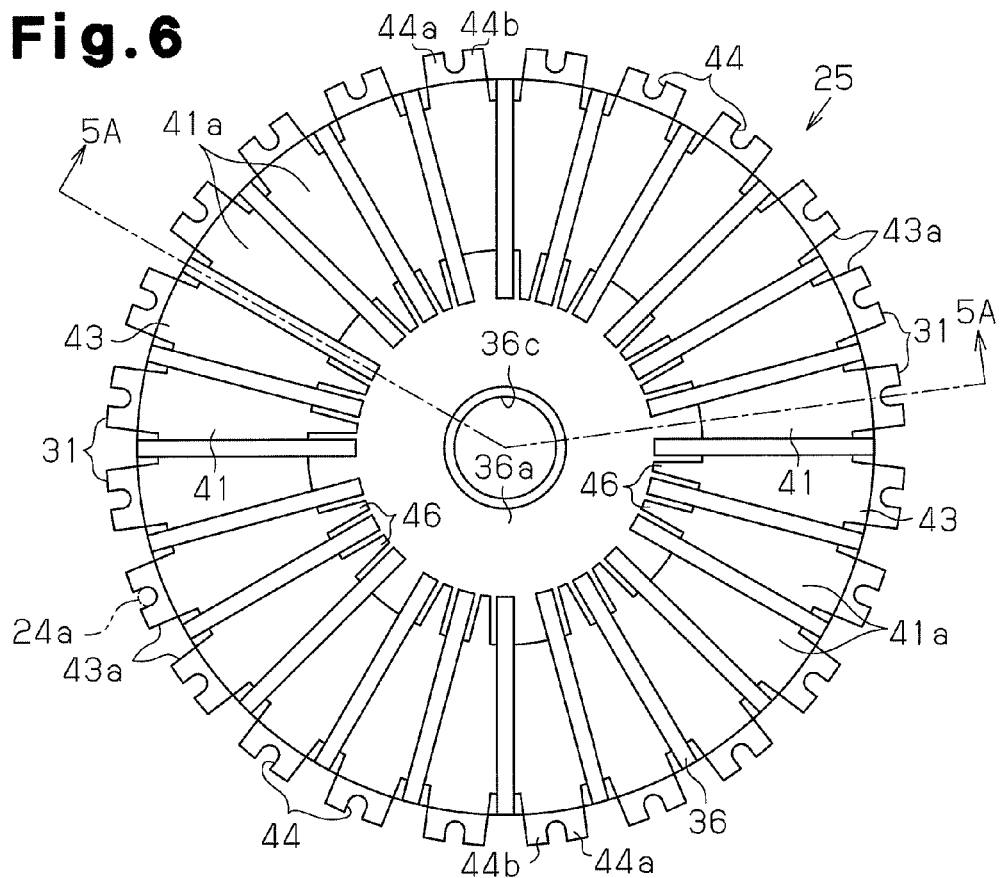
FIG. 6 is a bottom view showing a commutator arranged in the motor illustrated in FIG. 1.

As illustrated in FIG. 6, the twenty-four segments 31 are spaced at equal angular intervals in the circumferential direction in such a manner that a predetermined distance is defined between each circumferentially adjacent pair of the segments 31. As viewed from the axial direction of the rotary shaft 21 (the direction perpendicular to the surface of the sheet of FIG. 6), the segments 31 each form an arcuate shape having a circumferential width gradually increasing in a radially outward direction. The distance between each circumferentially adjacent pair of the segments 31 is uniform along the radial direction.

Figure 5B:
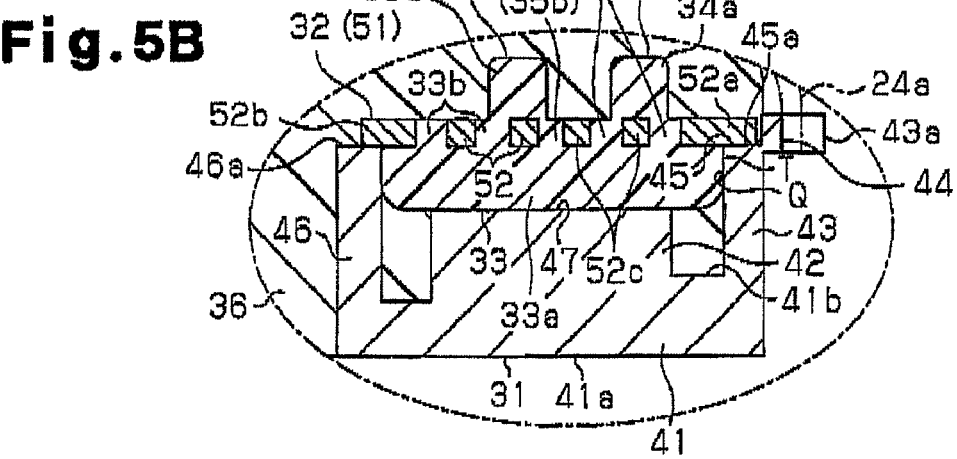
FIG. 5B is an enlarged view showing a portion of the commutator illustrated in FIG. 5A.
Figure 7:
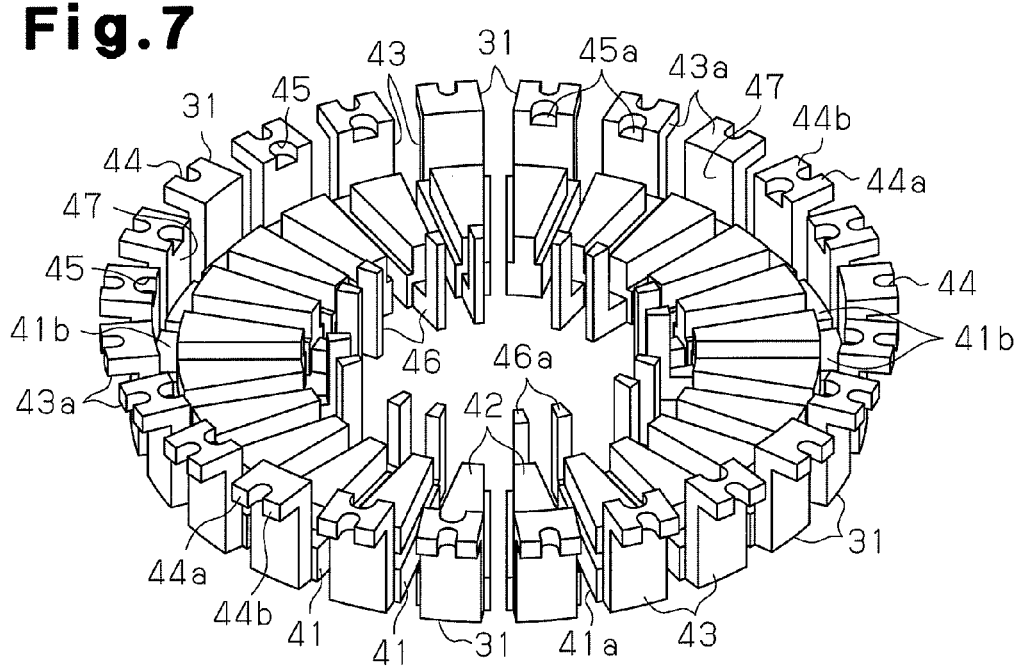
FIG. 7 is a perspective view showing segments of the commutator illustrated in FIG. 6.

As shown in FIG. 7, each segment 31 has a plate-like segment body 41. The segment body 41 has an arcuate shape as viewed in the axial direction of the rotary shaft 21. As illustrated in FIG. 5A, the lower surface of the segment body 41 forms a flat slidable contact surface 41a. As shown in FIG. 5B, a mounting portion 42 axially projects from an upper surface 41b opposed to the slidable contact surface 41a of the segment body 41 and is formed integrally with the upper surface 41b. The mounting portion 42 has an arcuate shape as viewed in the axial direction of the rotary shaft 21. The radial length of the mounting portion 42 is smaller than the radial length of the segment body 41. The circumferential width of the mounting portion 42 is smaller than the circumferential width of the segment body 41.

An outer connecting portion 43 is formed integrally with the radially outer end of each segment body 41. The outer connecting portion 43 extends from the radially outer end of the segment body 41 along the direction of the thickness of the segment body 41 (the axial direction of the commutator 25) and in the opposite direction to the slidable contact surface 41a. The outer connecting portion 43 projects from the mounting portion 42 along the direction of the thickness of the segment body 41 and is radially spaced from the mounting portion 42. As shown in FIG. 6, a connecting brim portion 43a projects radially outward from the distal end of each outer connecting portion 43. A connecting groove 44, which is recessed radially inward, is defined in the distal, radially outer end of each connecting brim portion 43a. Each connecting groove 44 is located at a circumferentially middle portion of the associated one of the connecting brim portions 43a. Each connecting groove 44 has a substantial U shape as viewed in the direction of the thickness of the segment body 41. The circumferential width of the connecting groove 44 is substantially equal to the diameter of the conductive wire forming each coil 24, which is shown in FIG. 2. Each connecting brim portion 43a has a pair of connecting claws 44a, 44b, which are formed at both sides of the connecting groove 44.

As illustrated in FIG. 7, a connecting recess 45 is defined in each of the sixteen segments 31 other than the eight segments 31 that are spaced at intervals of 45° in the circumferential direction. Specifically, each of the two segments 31 that are located between the two segments 31 spaced at an interval of 45° has the connecting recesses 45. The connecting recess 45 is provided in the proximal end of the connecting brim portion 43a. The connecting recess 45 has an opening facing upward and radially inward as viewed in FIG. 7. A bottom surface 45a of each connecting recess 45 is a flat surface parallel with the slidable contact surface 41a.

Out of the twenty-four segments 31, the eight segments 31 without the connecting recesses 45 and the eight segments 31 located to the immediate left of the aforementioned eight segments 31 each include an inner connecting portion 46. Each inner connecting portion 46 is formed integrally with the radially inner end of the associated one of the segment bodies 41. Each inner connecting portion 46 extends radially inward from the radially inner end of the associated segment body 41 by a predetermined distance. The inner connecting portion 46 then extends along the direction of the thickness of the segment body 41 and in the opposite direction of the slidable contact surface 41a. The distal end of the inner connecting portion 46 projects from the mounting portion 42. The distal end surface of the inner connecting portion 46 forms a flat inner connecting surface 46a parallel with the slidable contact surface 41a. The inner connecting surface 46a is in the same plane as the bottom surface 45a of the corresponding connecting recess 45.

As has been described, in each of the sixteen segments 31 having the inner connecting portions 46, the outer connecting portion 43 and the inner connecting portion 46 axially project from the mounting portion 42. Further, in each of these segments 31, the outer connecting portion 43, the inner connecting portion 46, and the mounting portion 42 form a positioning recess 47.

The slidable contact surfaces 41a of the twenty-four segments 31, which are constructed as described above, are all in the same plane. Also, the inner connecting surfaces 46a and the bottom surfaces 45a of the connecting recesses 45 are all in the same plane.

Figure 8A:
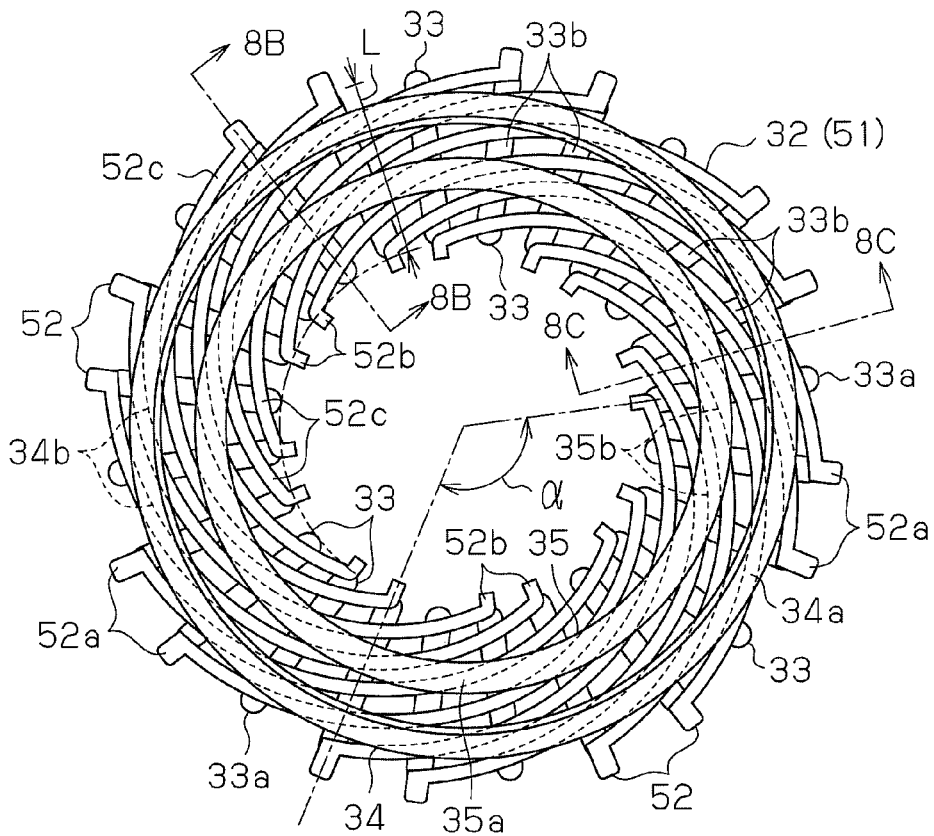
FIG. 8A is a plan view showing a short-circuit member assembly including spacing members formed integrally with the assembly.

As illustrated in FIG. 8A, the short-circuit member assembly 32 includes a single group 51 of flat plate-like short-circuit pieces 52. The short-circuit piece group 51 includes sixteen short-circuit pieces 52, which are arranged in a circumferential direction.

Each short-circuit piece 52 is shaped like a flat plate and has conductivity. Each short-circuit piece 52 includes an outer terminal 52a, an inner terminal 52b, and a connecting portion 52c. The outer terminal 52a is located radially outward and the inner terminal 52b is arranged radially inward from the outer terminal 52a. The connecting portion 52c connects the outer terminal 52a and the inner terminal 52b to each other. Each outer terminal 52a substantially has a rectangular shape. The circumferential width of each outer terminal 52a is equal to the circumferential width of each connecting recess 45 of the segment 31. The inner terminal 52b substantially has a rectangular plate-like shape smaller than that of the outer terminal 52a. The circumferential width of each inner terminal 52b is sized correspondingly to the circumferential width of the inner connecting surface 46a of the inner connecting portion 46 of each segment 31. In each short-circuit piece 52, the inner terminal 52b is arranged offset from the outer terminal 52a at a predetermined offset angle θ in the circumferential direction (the counterclockwise direction as viewed in FIG. 8). Each connecting portion 52c has a curved shape extending along an involute curve. In the present embodiment, the offset angle θ is set to 120°. The width of each connecting portion 52c (the dimension of the connecting portion 52c in a direction perpendicular to the longitudinal direction of the connecting portion 52c) is set to approximately 0.5 mm. The short-circuit piece group 51 is formed by the sixteen short-circuit pieces 52. Thus, the amount of the electric current flowing through the short-circuit pieces 52 corresponds to two thirds of the amount of the total electric current supplied to the motor portion 11. Accordingly, the cross-sectional area of each connecting portion 52c is set to a value greater than or equal to two thirds of the cross-sectional area of the conductive wire forming each coil 24.

The short-circuit pieces 52 are arranged in such a manner that each short-circuit piece 52 is spaced 15° from the circumferentially adjacent one of the short-circuit pieces 52 at one side and spaced 30° from the circumferentially adjacent one of the short-circuit pieces 52 at the other side. Thus, each of the sixteen outer terminals 52a is spaced 15° from the circumferentially adjacent one of the outer terminals 52a at one side and spaced 30° from the circumferentially adjacent one of the outer terminals 52a at the other side. The connecting portions 52c are spaced at constant intervals in the circumferential direction. A clearance is defined between each circumferentially adjacent pair of the connecting portions 52c. The width of the interval between each circumferentially adjacent pair of the connecting portions 52c is substantially constant along the direction in which each connecting portion 52c extends (the longitudinal direction of the connecting portion 52c).

The twenty-four first spacing members 33 are each formed of insulating resin material and integrally with the short-circuit member assembly 32. Each spacing member 33 has a first support portion 33a extending radially and a plurality of first spacing projections 33b provided as an integral body with the first support portion 33a.

The first support portion 33a extends radially on a first end surface Sa (the end surface opposite to the surface of the sheet of FIG. 8A) in the direction of the thickness of the short-circuit member assembly 32. The first support portion 33a substantially has a bar-like shape. The circumferential width of the first support portion 33a is substantially equal to the circumferential width of the outer terminal 52a. The radial length of the first support portion 33a is set to a length less than the range between the imaginary circle formed by the outer circumferential end of the short-circuit member assembly 32 and the imaginary circle formed by the inner circumferential end of the short-circuit member assembly 32. In the present embodiment, as shown in FIG. 5B, the length of the first support portion 33a along the radial direction of the short-circuit member assembly 32 is equal to the radial width of the annular range corresponding to the connecting portions 52c. The radial length of the first support portion 33a is equal to the radial length of the positioning recess 47 of the segment 31. In other words, the radial length of the first support portion 33a is equal to the distance between each outer connecting portion 43 and the associated inner connecting portion 46. The height (the axial height) of the first support portion 33a in the direction of the thickness of the short-circuit member assembly 32 is equal to the depth of the positioning recess 47 of the segment 31. The twenty-four first support portions 33a are spaced at equal angular intervals (in the present embodiment, at 15°) in the circumferential direction in such a manner that the circumferential position of each outer terminal 52a coincides with the circumferential position of the corresponding first support portion 33a.

Figure 8B:
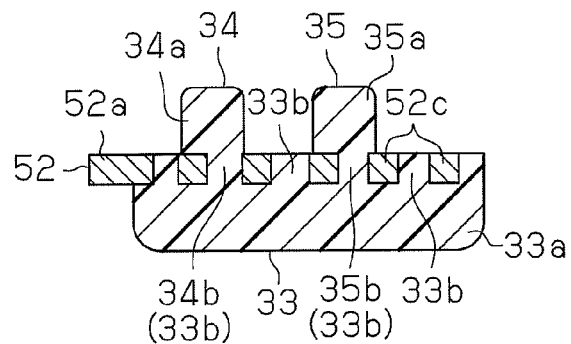
FIG. 8B is a cross-sectional view taken along line 8B-8B, showing the short-circuit member assembly illustrated in FIG. 8A.

The multiple first spacing projections 33b project in the direction of the thickness of the short-circuit member assembly 32. As shown in FIGS. 8A and 8B, the first spacing projections 33b are formed integrally with the associated support portion 33a in such a manner that the first spacing projections 33b are located at both sides of the corresponding one of the connecting portions 52c in the direction of the width of the connecting portion 52c, which extends across the first support portion 33a substantially in the circumferential direction. Each first spacing projection 33b is arranged between the corresponding radial adjacent pair of the connecting portions 52c. The circumferential width of the first spacing projection 33b is equal to the circumferential width of the first support portion 33a. The height (the axial height) of the first spacing projection 33b is equal to the thickness of each short-circuit piece 52. Further, the radial width of the first spacing projection 33b is set to a value corresponding to the interval between the connecting portions 52c, which extend across the first support portions 33a substantially in the circumferential direction. The first spacing projections 33b, which are each provided between the corresponding radial adjacent pair of the connecting portions 52c, suppress relative movement of the short-circuit pieces 52 in a radial direction.

Figure 8C:
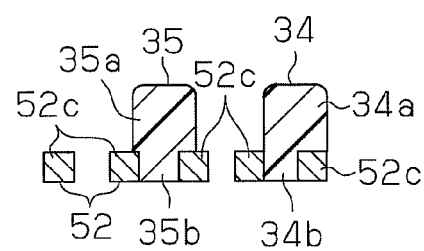
FIG. 8C is a cross-sectional view taken along line 8C-8C, showing the short-circuit member assembly illustrated in FIG. 8A.

As shown in FIGS. 8A to 8C, the second spacing members 34, 35 are each formed of insulating resin material. The second spacing members 34, 35 are provided on a second end surface Sb (the end surface closer to the surface of the sheet of FIG. 8A) of the short-circuit member assembly 32. The second spacing members 34, 35 are formed integrally with the short-circuit member assembly 32. The second spacing member 34 has a second support portion 34a with an annular shape extending along the circumferential direction of the short-circuit member assembly 32 and a plurality of (in the present embodiment, sixteen) second spacing projections 34b that are formed integrally with the second support portion 34a. Similarly, the second spacing member 35 has a second support portion 35a with an annular shape extending along the circumferential direction of the short-circuit member assembly 32 and a plurality of (in the present embodiment, sixteen) second spacing projections 35b that are formed integrally with the second support portion 35a.

The radial centers of the second support portions 34a, 35a coincide with the radial center of the short-circuit member assembly 32. In other words, the second support portion 34a and the second support portion 35a are provided concentrically. The second support portion 34a is provided between the outer terminals 52a and the inner terminals 52b of the short-circuit member assembly 32. The second support portion 35a is located radially inward from the second support portion 34a and radially outward from the inner terminals 52b. The height of the second support portions 34a, 35a in the direction of the thickness of the short-circuit member assembly 32 is substantially equal to the corresponding height of the first support portion 33a.

The sixteen second spacing projections 34b, which are projected from the second support portion 34a, are spaced at equal angular intervals in the circumferential direction. Each second spacing projection 34b extends from the inner circumferential end to the outer circumferential end of the second support portion 34a in such a manner that the second spacing projection 34b is located between the corresponding adjacent pair of the connecting portions 52c. The second spacing projection 34b has a curved shape similar to that of each connecting portion 52c. The width (the dimension in the direction perpendicular to the longitudinal direction) of the second spacing projection 34b is equal to the width of the clearance between each circumferentially adjacent pair of the connecting portions 52c. The height of the second spacing projection 34b is equal to the thickness of the connecting portion 52c. The second spacing projections 35b, which are each projected from the second support portion 35a, are shaped identically with the second spacing projections 34b of the second support portion 34a. In this manner, the second spacing projections 34b, 35b arranged between the corresponding circumferentially adjacent pairs of the connecting portions 52c suppress relative movement of the short-circuit pieces 52 in the circumferential direction.

As shown in FIG. 8B, the first spacing member 33 faces the second spacing members 34, 35 in the direction of the thickness of the short-circuit member assembly 32. The portions between the first spacing member 33 and the second spacing members 34, 35 without the short-circuit pieces 52 correspond to the second spacing projections 34b, 35b and the first spacing projection 33b. In the present embodiment, the first spacing member 33 and the second spacing members 34, 35 are provided as an integral body through the portions without the short-circuit pieces 52 (the first spacing projections 33b and the second spacing projections 34b, 35b).

As shown in FIGS. 5A and 5B, the short-circuit member assembly 32, which is formed integrally with the first spacing member 33 and the second spacing members 34, 35, is arranged parallel with the slidable contact surface 41a with respect to the segments 31 arranged in the circumferential direction. Specifically, the surface of the short-circuit member assembly 32 closer to the first spacing member 33 faces the segments 31. The outer terminals 52a are received in the corresponding connecting recesses 45 of the segments 31 and contact the bottom surface 45a. The inner terminals 52b contact the inner connecting surfaces 46a of the corresponding inner connecting portions 46. The twenty-four first spacing members 33 each face the mounting portion 42 of the corresponding segment 31. The first support portions 33a each contact the distal end surface of the corresponding mounting portion 42. The radially outer end T of each first support portion 33a contacts the radially inner surface Q of the corresponding outer connecting portion 43. The first support portions 33a of the sixteen first spacing members 33, which correspond to the sixteen segments 31 having the positioning recesses 47, are received in the corresponding positioning recesses 47. The radially inner end of each first support portion 33a contacts the radially outer surface of the inner connecting portion 46. The outer terminals 52a and the outer connecting portions 43, which are held in mutual contact, are welded together. The inner terminals 52b and the inner connecting portions 46, which are held in mutual contact, are welded together.

The holding portion 36, which has a substantially disk-like shape, is formed of insulating resin material. A portion of each segment 31, the short-circuit member assembly 32, and the spacing members 33 to 35 are embedded in the resin material. The holding portion 36 thus holds the segments 31 and the short-circuit member assembly 32 as an integral body. A lower end surface 36a of the holding portion 36 is flush with the slidable contact surface 41a. An upper end surface 36b of the holding portion 36 is arranged upward from the second spacing members 34, 35, as viewed in FIG. 5A. The outer diameter of the holding portion 36 is equal to the diameter of the imaginary circle extending along the radially outer surfaces of the outer connecting portions 43 of the segments 31, or, specifically, the radially outer surfaces of the portions of the outer connecting portions 43 extending perpendicular to the slidable contact surfaces 41a. That is, the holding portion 36 covers the portions of each segment 31 other than the slidable contact surface 41a, the radially outer surface of the portion of the outer connecting portion 43 extending perpendicular to the slidable contact surface 41a, and the distal portion of the connecting brim portion 43a. The short-circuit member assembly 32, the first spacing members 33, and the second spacing members 34, 35 are covered as a whole by the holding portion 36. The insulating resin material forming the holding portion 36 is provided also in the portions between the circumferentially adjacent pairs of the connecting portions 52c without the first spacing projections 33b and the second spacing projections 34b, 35b. Each circumferentially adjacent pair of the connecting portions 52c are thus prevented from short-circuiting. The radially outer end of the upper end surface 36b has an arcuate cross section.

The outer connecting portion 43 of each segment 31 projects in the opposite direction to the slidable contact surface 41a. The connecting brim portion 43a, which is provided at the distal end of the outer connecting portion 43, is located closer to the upper end surface 36b than the slidable contact surface 41a (closer to the armature core 23, as viewed in FIG. 2). In the present embodiment, each connecting brim portion 43a projects radially outward from the holding portion 36 at the position closer to the upper end surface 36b than the slidable contact surface 41a by the distance corresponding to approximate two thirds of the thickness of the holding portion 36, or the axial thickness of the commutator 25.

A fixing bore 36c is provided in the radial center of the holding portion 36 and extends in the axial direction. The diameter of the fixing bore 36c is slightly smaller than the diameter of the rotary shaft 21. As illustrated in FIG. 2, the commutator 25 is fixed to the rotary shaft 21 by pressing the rotary shaft 21 into the fixing bore 36c from the side opposite to the slidable contact surface 41a.

A terminal 24a of each coil 24, which are introduced to the exterior through a plurality of through holes (not shown) defined in the bottom of the fixing collar 22, is connected to the corresponding one of the segments 31. As shown in FIGS. 5A and 5B, the terminal 24a of each coil 24 is electrically connected to the segment 31 by inserting the terminal 24a into the connecting groove 44 so that the terminal 24a is held between the two connecting claws 44a, 44b (see FIG. 7). In FIGS. 5A and 5B, only one of the terminals 24a is illustrated.

Figure 9:
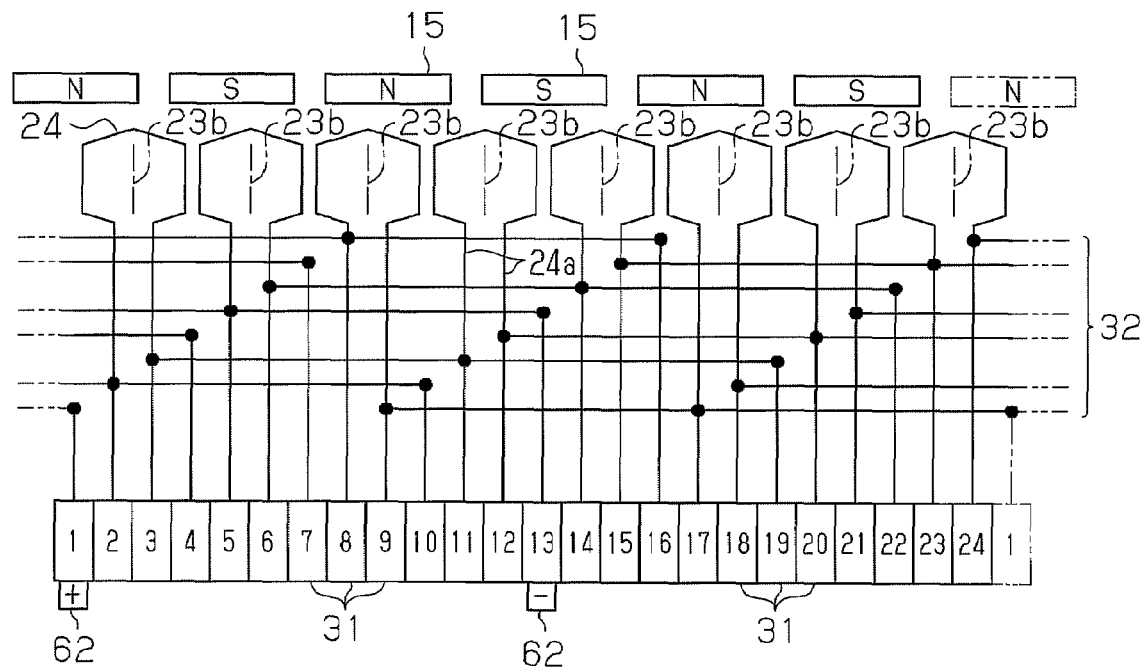
FIG. 9 is a connection diagram representing the motor portion illustrated in FIG. 2.

By connecting the terminals 24a to the segments 31, as illustrated in FIG. 9, the terminals 24a of the prescribed ones of the coils 24 are short-circuited through the commutator 25.

Figure 10:
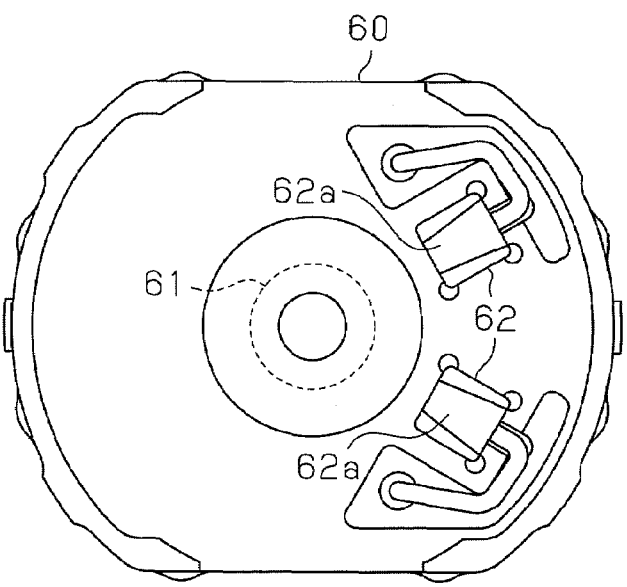
FIG. 10 is a plan view showing a brush holder of the motor portion illustrated in FIG. 2.

A brush holder 60, which is shown in FIG. 10, is received in an opening 13c of the motor housing 13, which is shown in FIG. 2. FIG. 10 is a plan view showing the brush holder 60 as viewed from the side corresponding to the motor portion 11. A bearing 61 is secured to the center of the brush holder 60 to support the distal end of the rotary shaft 21 in a radial direction. A pair of feeder brushes 62 are each provided at positions offset from the center of the brush holder 60 in a radially outward direction and mutually spaced at a predetermined interval in the circumferential direction. In other words, the two feeder brushes 62 are located on an imaginary concentric circle. Each feeder brush 62 is slidable relative to the brush holder 60 along the axial direction of the rotary shaft 21. As shown in FIG. 2, a spring 63 applies urging force to a rear end surface of each brush 62. The distal end of the brush 62 is pressed against and held in contact with the corresponding slidable contact surface 41a of the commutator 25.

As shown in FIG. 2, each feeder brush 62 has a contact portion 62a held in contact with the slidable contact surface 41a and a proximal portion receiving the urging force from the spring 63. The contact portion 62a is shaped as a truncated pyramid and the proximal portion is shaped as a rectangular parallelepiped. In other words, each feeder brush 62 has a two-stepped shape. Each segment 31, which contacts the feeder brush 62, has an arcuate shape in such a manner that the circumferential interval between the adjacent pairs of the segments 31 become uniform in the radial direction. In correspondence with the arcuate shape of each segment 31, the contact portion 62a of each feeder brush 62 has a trapezoidal cross section. The feeder brushes 62 are electrically connected to a connector portion 64 (see FIG. 1), which is secured to a gear housing 70, as will be described below. The feeder brushes 62 thus supply the drive power supplied from the exterior through the connector portion 64 to the armature 20 through the commutator 25. The armature 20 is rotated by the power fed through the commutator 25.

Figure 3:
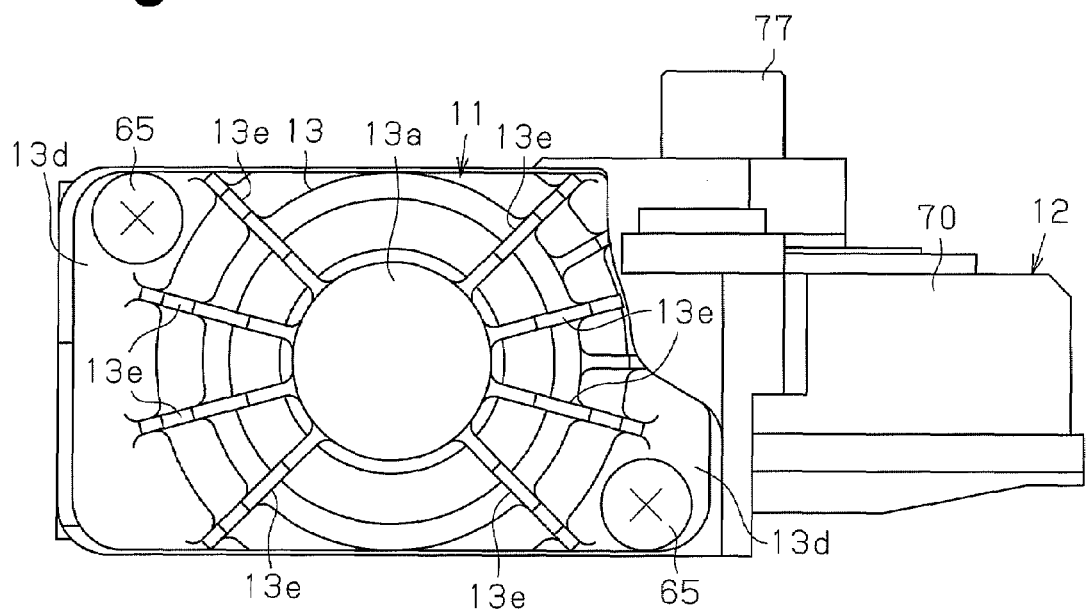
FIG. 3 is a plan view showing the motor portion shown in FIG. 2.

A pair of securing portions 13d, which extend radially outward, are provided around the opening 13c of the motor housing 13 at opposed positions with respect to the axis of the motor housing 13. A screw 65 is threaded into the gear housing 70 through each of the securing portions 13d, thus fixing the motor housing 13 to the gear housing 70. The motor housing 13 is formed of resin. As shown in FIGS. 2 and 3, eight reinforcing ribs 13e are provided on the outer circumferential surface of the motor housing 13. The reinforcing ribs 13e extend radially from the center of the bottom 13a in continuous manners. Specifically, four reinforcing ribs 13e, which are spaced substantially at equal angular intervals, extend from the center of the bottom 13a toward the corresponding securing portion 13d. The reinforcing ribs 13e increase rigidity of the motor housing 13 and suppress oscillation and noise generated by the motor portion 11 in operation.

As shown in FIG. 1, the decelerating portion 12 decelerates rotation of the rotary shaft 21. The decelerating portion 12 has the gear housing 70 formed of resin material. The gear housing 70 accommodates a worm shaft 71, a worm wheel 72, and a clutch 73. The worm shaft 71 is arranged coaxially with the rotary shaft 21 of the motor portion 11. A first end of the worm shaft 71 is operably connected to the distal end of the rotary shaft 21 through the clutch 73. The worm 71a is formed at the axial center of the worm shaft 71. Both ends of the worm shaft 71 is supported by a pair of bearings 74, 75 arranged in the gear housing 70 rotatably and in the radial direction. A ball 76, which receives thrust load from the worm shaft 71, is held in contact with a second end of the worm shaft 71. The elastic force produced by the thrust adjustment member 19 is transmitted to the worm shaft 71 through the rotary shaft 21 and the clutch 73. This prevents the worm shaft 71, along with the rotary shaft 21, from becoming unstable in the axial direction.

The worm wheel 72 has an output shaft 77 fixed to the center of the worm wheel 72 and rotates integrally with the output shaft 77. The worm wheel 72 is engaged with the worm 71a so that rotation of the worm shaft 71, which is driven by the motor portion 11, is decelerated by the worm wheel 72 and output from the output shaft 77. The window glass is selectively opened and closed in correspondence with rotation of the output shaft 77.

The clutch 73 prevents the worm shaft 71 from rotating due to the force input to the worm shaft 71 through the output shaft 77 while transmitting the rotation of the rotary shaft 21, which is driven by the motor portion 11, to the worm shaft 71. This prevents idle rotation of the output shaft 77 caused by external force applied through the window glass. Thus, the window glass is prevented from undesirably falling due to its own weight and being manually opened.

Next, a method for manufacturing the commutator 25 provided in the motor 10 will be explained. The method includes a punching step, a primary molding step, a removing step, a segment member forming step, an arranging step, a welding step, a secondary molding step, and a cutting step.

Figure 11:
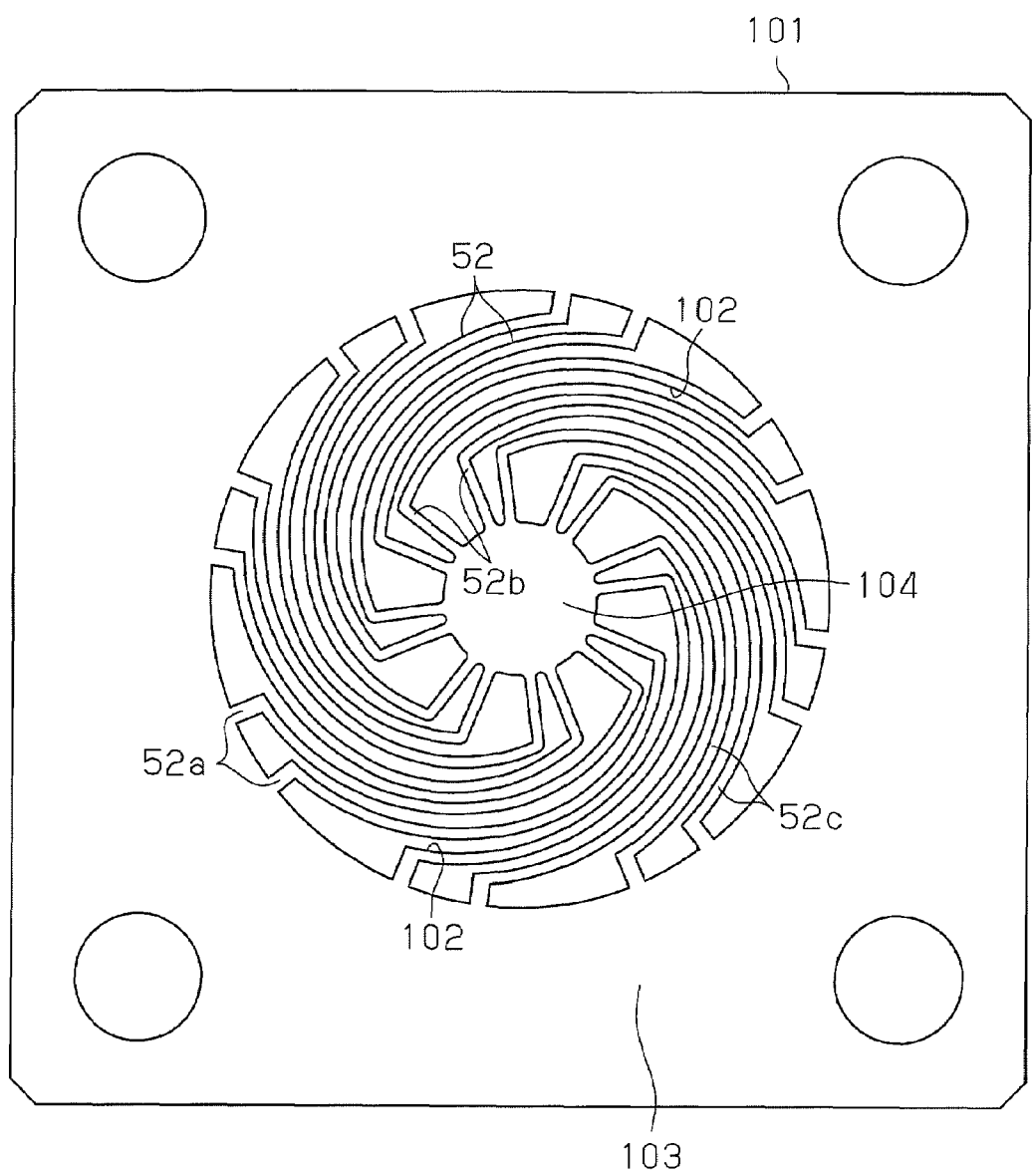
FIG. 11 is a plan view showing a plate material from which the short-circuit member assembly shown in FIG. 8 is manufactured.

First, in the punching step, as illustrated in FIG. 11, sixteen slits 102, each of which is slanted radially, are punched in a conductive plate material 101 through pressing. As a result, sixteen short-circuit pieces 52 are each formed in the plate material 101 at the positions between the corresponding adjacent pairs of the slits 102. After the punching step, in the plate material 101, the sixteen outer terminals 52a are connected together through the portions (the outer connecting portions 103) of the plate material 101 located around the annular range corresponding to the slits 102. The sixteen inner terminals 52b are connected together through the portions (the inner connecting portions 104) of the plate material 101 located radially inward from the annular range corresponding to the slits 102. The width of the connecting portion 52c of each short-circuit piece 52, which is formed in the plate material 101, is extremely small, or approximately 0.5 mm. The properties of the plate material 101 are thus selected with deformation caused by punching and punching performance taken into consideration. In the welding step, which will be performed later, the outer terminal 52a of each short-circuit piece 52 is welded to the corresponding segment 31 through TIG (tungsten inert gas) welding. Thus, if the plate material 101 contains a great amount of zinc, welding may be hampered. To solve this problem, with conductivity and zinc content taken into consideration, a copper alloy with conductivity greater than or equal to 2 [μΩcm] and a zinc content of 20% or less is used as the plate material 101.

Figure 12A:
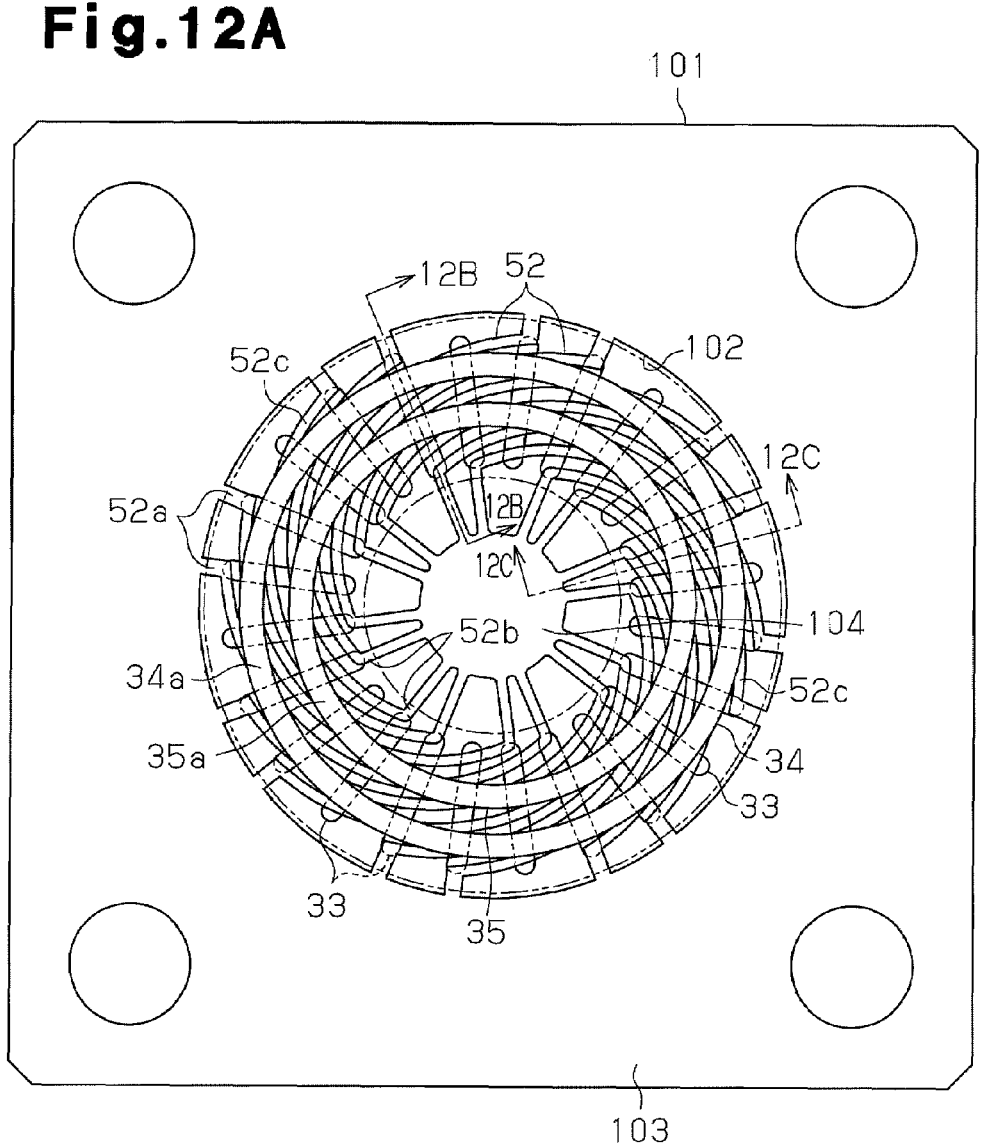
FIG. 12A is a plan view showing the plate material from which the short-circuit member assembly is manufactured.
Figure 12B:
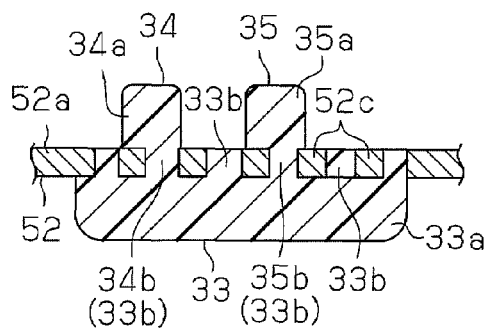
FIG. 12B is a cross-sectional view taken along line 12B-12B, showing the plate material illustrated in FIG. 12A.
Figure 12C:
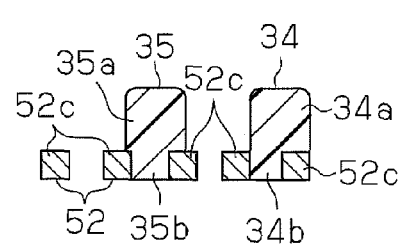
FIG. 12C is a cross-sectional view taken along line 12C-12C, showing the plate material illustrated in FIG. 12A.

The punching step is followed by the primary molding step. In the primary molding step, as illustrated in FIG. 12A, the first spacing members 33 and the second spacing members 34, 35 are formed integrally with the plate material 101. To begin with, the plate material 101 having the slits 102 is placed in a mold (not shown) for shaping the first spacing members 33 and the second spacing members 34, 35. Subsequently, molten insulating resin material is poured into the mold. As the insulating resin material is cooled and hardened in the mold, the twenty-four first spacing members 33 each having the first spacing projection 33b and the second spacing members 34, 35 each having the second spacing projection 34b, 35b are formed integrally with the plate material 101 (see FIGS. 12B and 12C).

The removing step is then carried out. In the removing step, the plate material 101 is cut apart along the double-dotted chain lines of FIG. 12A. The outer connecting portions 103 and the inner connecting portions 104 are thus removed from the plate material 101. In this manner, the short-circuit member assembly 32 is completed.

Figure 13:
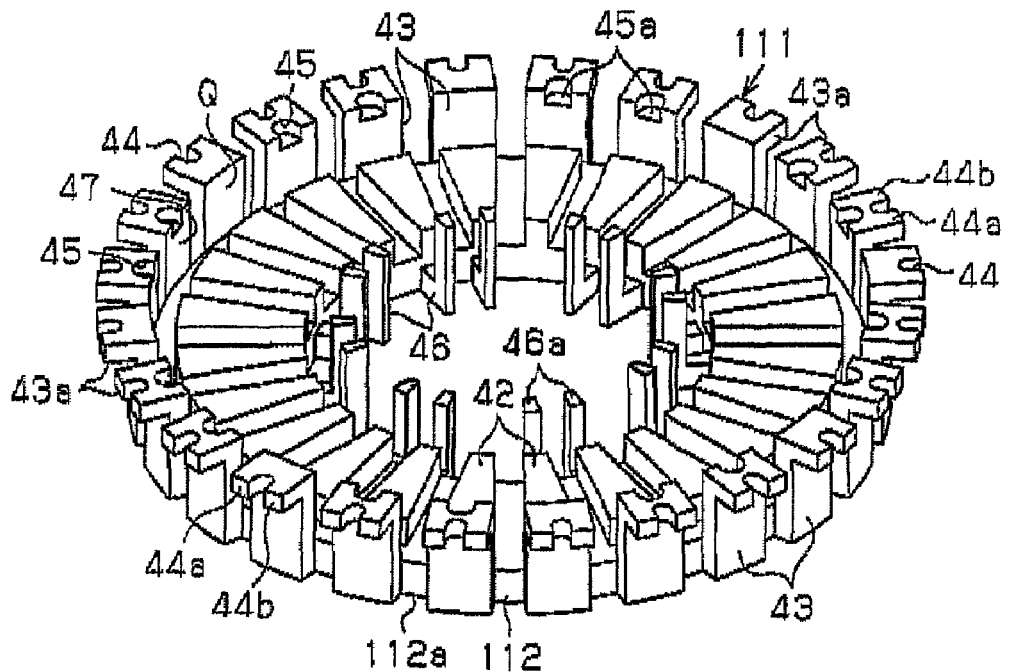
FIG. 13 is a perspective view showing a segment forming member that forms segments, which are components of the commutator shown in FIG. 6.

Subsequently, the segment member forming step is performed. In the segment member forming step, a segment forming member 111, which is shown in FIG. 13, is provided. In the following, the segment forming member 111 will be explained in detail. The segment forming member 111 has an annular body 112. The body 112 corresponds to a portion in which the twenty-four segment bodies 41, which are shown in FIG. 7, are provided. The radial width of the body 112 is equal to the radial length of each segment body 41. The thickness of the body 112 is equal to the thickness of the segment body 41. One end surface (the lower surface as viewed in FIG. 13) of the body 112 is a flat surface 112a. The twenty-four mounting portions 42 are formed integrally with the other end surface of the body 112 (the upper surface as viewed in the drawing) and spaced at equal angular intervals in the circumferential direction. The twenty-four outer connecting portions 43 are formed integrally with the outer circumferential end of the body 112. The outer connecting portions 43 are spaced at equal angular intervals in the circumferential direction in such a manner that the circumferential position of each outer connecting portion 43 coincides with the circumferential position of the corresponding mounting portion 42.

The sixteen inner connecting portions 46 are formed integrally with the inner circumferential end of the body 112 in such a manner that the circumferential position of each of the inner connecting portions 46 coincides with the circumferential position of the corresponding one of the sixteen outer connecting portions 43. Specifically, eight of the outer connecting portions 43 do not include a connecting recess 45 and another eight of the outer connecting portions 43 are located to immediate left of the aforementioned eight outer connecting portions 43. Each outer connecting portion 43, the corresponding one of the mounting portions 42, and the associated one of the inner connecting portions 46, which are arranged radially, define the positioning recess 47.

The segment forming member 111 is formed by sintering conductive metal powder, which is, for example, copper powder. In sintering, pressure is applied to the metal powder in the axial direction of the segment forming member 111, or the direction perpendicular to the flat surface 112a.

Figure 14:
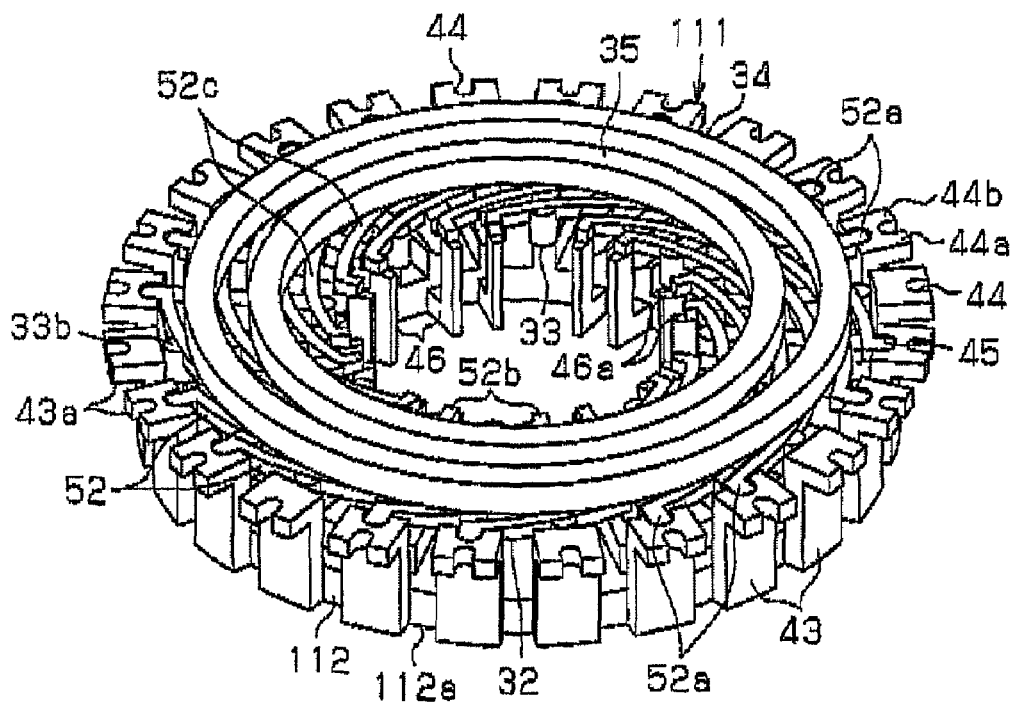
FIG. 14 is a perspective view showing the segment forming member illustrated in FIG. 13, on which the short-circuit member assembly is arranged.

Then, the arranging step follows. In this step, as illustrated in FIG. 14, the short-circuit member assembly 32 is arranged with respect to the segment forming member 111 in such a manner that the first spacing members 33 each contact the mounting portion 42 of the corresponding segment 31. The sixteen outer terminals 52a are accommodated in the connecting recesses 45 in such a manner that each outer terminal 52a contacts the bottom surface 45a (see FIG. 13) of the connecting recess 45 defined in the corresponding one of the sixteen outer connecting portions 43. Each of the sixteen inner terminals 52b contacts the inner connecting surface 46a (see FIG. 13) of the corresponding one of the sixteen inner connecting portions 46. The twenty-four first spacing members 33 correspond to the twenty-four mounting portions 42. The radially outer end T of each first support portion 33a contacts the radially inner surface Q of the corresponding outer connecting portion 43. The radially inner end of the first support portion 33a of each first spacing member 33 contacts the radially outer surface of the corresponding inner connecting portion 46.

The arranging step is followed by the welding step. In the welding step, the outer terminals 52a and the corresponding outer connecting portions 43 that are held in mutual contact and the inner terminals 52b and the corresponding inner connecting portions 46 that are held in mutual contact are welded together through TIG welding. The segment forming member 111 and the short-circuit member assembly 32 are thus provided as an integral body.

Subsequently, the secondary molding step is carried out. In this step, the holding portion 36 (see FIG. 15) is provided. In other words, the segment forming member 111 and the short-circuit member assembly 32, which are now an integral body, are placed in a mold (not shown) for molding the holding portion 36. Molten insulating resin material is then poured into the mold. Some of the resin material is provided to the portions between the adjacent pairs of the connecting portions 52c. In this state, the first spacing projections 33b, each of which is located between the corresponding adjacent pair of the connecting portions 52c, suppress radial movement of the connecting portions 52c caused by pressure produced by pouring of the insulating resin material into the mold. Further, the second spacing projections 34b, 35b, each of which is located between the corresponding adjacent pair of the connecting portions 52c, suppress circumferential movement of the connecting portions 52c caused by the pressure produced through pouring of the insulating resin material into the mold. Also, the first spacing members 33 and the second spacing members 34, 35 suppress deformation of the short-circuit member assembly 32 caused by the pressure produced through pouring of the insulating resin material into the mold.

The insulating resin material in the mold is then cooled and hardened to complete the holding portion 36, which holds the segment forming member 111 and the short-circuit member assembly 32 as one integral body. The segment forming member 111 and the short-circuit member assembly 32 held together by the holding portion 36 are isolated from the mold after formation of the holding portion 36.

Figure 15:
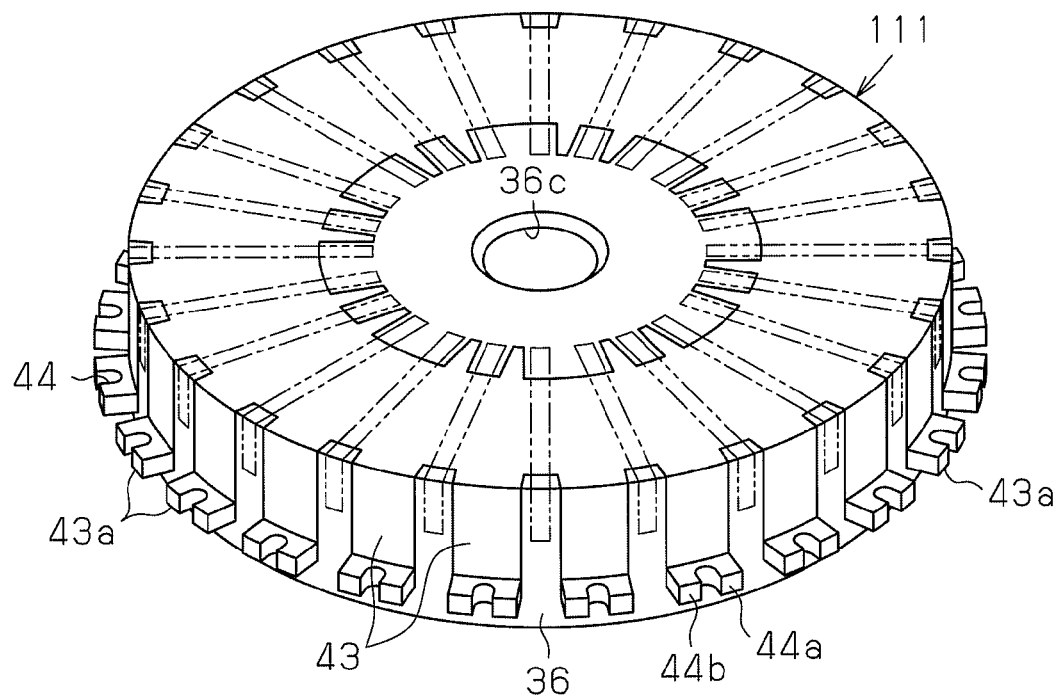
FIG. 15 is a perspective view showing the segment forming member after a secondary molding step.

Subsequently, the cutting step is carried out. In the cutting step, while being maintained in a state held by the holding portion 36, the segment forming member 111 is cut apart in such a manner that the twenty-four segments 31, which are shown in FIG. 6, are provided. More specifically, as illustrated in FIG. 15, the portions of the body 112 between the corresponding circumferentially adjacent pairs of the mounting portions 42 (see FIG. 13) are cut in radial directions as indicated by the double-dotted chain lines. In this manner, a groove having a depth less than the depth that reaches the short-circuit member assembly 32 (a portion indicated by corresponding double-dotted chain lines in FIG. 15) is provided in the segment forming member 111 and the holding portion 36, which are maintained as the integral body. In this manner, the segment forming member 111 are divided into twenty-four sections. As a result, the twenty-four segments 31 are formed so that the commutator 25 is completed.

The present embodiment has the following advantages.

(1) In the primary molding step, the first spacing members 33 and the second spacing members 34, 35 are formed integrally with the short-circuit member assembly 32. The first spacing projections 33b and the second spacing projections 34b, 35b are arranged between the corresponding circumferentially adjacent pair of the connecting portions 52c. This prevents radial movement and circumferential movement of the connecting portions 52c from being caused by the pressure produced by molding of the holding portion 36 in the secondary molding step, which is carried out after the primary molding step. As a result, each circumferentially adjacent pair of the connecting portions 52c are prevented from being short-circuited. In other words, insulation between each circumferentially adjacent pair of the connecting portions 52c is ensured.

(2) The first support portion 33a of each first spacing member 33 extends radially. Thus, when the molten insulating resin material is provided in the mold in which the short-circuit member assembly 32 is placed so as to form the holding portion 36, the molten material is allowed to easily flow in a radial direction by passing through each adjacent pair of the first spacing members 33.

(3) The twenty-four first spacing members 33 are spaced at equal angular intervals in the circumferential direction. The radial length of each support portion 33a is equal to the radial length L of the range corresponding to the connecting portions 52c. Further, each first spacing member 33 includes the first spacing projections 33b located at both sides of each of the connecting portions 52c, which extend across the support portions 33a substantially in the circumferential direction. In other words, multiple first spacing projections 33b are provided between every adjacent pair of the connecting portions 52c. The first spacing projections 33b suppress radial movement of every connecting portion 52c. Thus, even if molding pressure is radially applied to each connecting portion 52c in molding of the holding portion 36, each radial adjacent pair of the connecting portions 52c are prevented from being short-circuited mutually. Also, the interval between each adjacent pair of the connecting portions 52c is maintained constant.

(4) The two annular second spacing members 34, 35 are formed integrally with the short-circuit member assembly 32. The second spacing projections 34b, 35b of the second spacing members 34, 35 effectively suppress circumferential movement of each connecting portion 52c. Thus, even if the molding pressure is circumferentially applied to each connecting portion 52c when the holding portion 36 is molded, each circumferentially adjacent pair of the connecting portions 52c are effectively prevented from being short-circuited. This further effectively ensures insulation between each circumferentially adjacent pair of the connecting portions 52c. Further, the annular second spacing members 34, 35 are arranged concentrically with respect to the short-circuit member assembly 32. The second spacing members 34, 35 thus maintains a constant interval between each adjacent pair of the connecting portions 52c. Also, since the short-circuit member assembly 32 is reinforced by the second spacing members 34, 35, the short-circuit member assembly 32 is prevented from deforming when the holding portion 36 is molded.

(5) The support portion 33a of each first spacing member 33 extends radially and the second support portion 34a, 35a of each second spacing member 34, 35 extends circumferentially. That is, as viewed in the direction of the thickness of the short-circuit member assembly 32, the first support portions 33a and the corresponding second support portions 34a, 35a extend perpendicular to each other. The multiple first spacing projections 33b are provided on the first support portion 33a and aligned in the extending direction of the first support portion 33a, or in the radial direction. The multiple second spacing projections 34b, 35b are provided on the corresponding second support portions 34a, 35a and aligned in the extending direction of the second support portion 34a, 35a, or the circumferential direction. This arrangement further effectively suppresses circumferential movement and radial movement of the connecting portions 52c. As a result, when the holding portion 36 is molded, each circumferentially adjacent pair of the connecting portions 52c are further effectively prevented from being short-circuited. Insulation between such connecting portions 52c are thus further effectively ensured.

(6) Since each first support portion 33a extends radially, the first spacing members 33 have a simply shape. Further, since each second support portion 34a, 35a has an annular shape, the second spacing members have a simple shape. This makes it easy to form the first spacing members 33 and the second spacing members 34, 35.

(7) The first spacing members 33 and the second spacing members 34, 35 are formed of insulating resin material and integrally with the short-circuit member assembly 32. Thus, the sixteen short-circuit pieces 52 are prevented from being separated from one another before the holding portion 36 is molded. This makes it easy to handle the short-circuit member assembly 32 when the commutator 25 is manufactured.

(8) In the arranging step, the radially outer end T of each support portion 33a contacts the radially inner surface Q of the corresponding outer connecting portion 43. This facilitates positioning of the short-circuit member assembly 32 with respect to the segment forming member 111 in the radial direction. Further, each first support portion 33a is received in the corresponding positioning recess 47 defined in the segment forming member 111 so as to suppress radial movement of the short-circuit member assembly 32 relative to the segment forming member 111. As a result, the welding step is easily carried out.

(9) In the arranging step, arrangement of the outer terminals 52a in the corresponding connecting recesses 45 facilitates positioning of the short-circuit member assembly 32 with respect to the segment forming member 111 in the circumferential direction. Further, such arrangement suppresses circumferential movement of the short-circuit member assembly 32 relative to the segment forming member 111. This facilitates the welding step.

(10) In the commutator 25, each connecting brim portion 43a, to which the terminal 24a of the corresponding coil 24 is connected, projects radially outward from the holding portion 36 at a position closer to the armature core 23 than the slidable contact surface 41a. This reduces the distance between the connecting brim portion 43a and the armature core 23, thus decreasing the length of each terminal 24a. This makes it easy to handle the terminals 24a, further facilitating connection of the terminals 24a to the connecting brim portions 43a.

(11) The circumferential end of the upper end surface 36b of the holding portion 36 has an arcuate cross section. As a result, even if the terminal 24a of any coil 24 contacts the circumferential end of the upper end surface 36b of the holding portion 36, a break does not occur easily in the terminal 24a.

(12) The connecting groove 44 is defined in the distal end of each connecting brim portion 43a. Thus, by inserting the terminal 24a of each coil 24 through the corresponding connecting groove 44 so that the terminal 24a is clamped between the associated connecting claws 44a, 44b, electrical connection between the terminal 24a and the corresponding segment 31 is facilitated.

(13) Since the commutator 25 having the flat plate-like short-circuit member assembly 32 is arranged in the motor portion 11, it is unnecessary to ensure a space in which pressure equalizing wires formed by conductive wires are arranged between the commutator 25 and the armature core 23. This decreases the axial length of the motor portion 11.

The present embodiment may be modified as follows.

The short-circuit member assembly 32 may be arranged relative to the segments 31 in such a manner that the second spacing members 34, 35 face the segments 31. In this case, by allowing the second support portions 34a of the second spacing members 34 to contact the radially if inner surfaces Q of the outer connecting portions 43, radial movement of the short-circuit member assembly 32 relative to the segments 31 (the segment forming member 111) is suppressed.

The first spacing members 33 and the second spacing members 34, 35 may be formed separately from the short-circuit member assembly 32 and then secured to the short-circuit member assembly 32.

Each first support portion 33a may extend in a direction crossing the radial direction on an end surface of the short-circuit member assembly 32 in the direction of the thickness of the short-circuit member assembly 32. In this case, the first support portion 33a may be formed in a curved manner.

As long as the shape of each second support portion 34a, 35a is different from the shape of each first support portion 33a, the shape of the second support portion 34a, 35a is not restricted to the shape of the above embodiment. For example, each second support portion 34a, 35a may be formed in an arcuate shape. Alternatively, the second support portions 34a, 35a may be formed in a curved shape that does not correspond to the circumferential direction of the short-circuit member assembly 32. In this manner, the second spacing projections 34b, 35b arranged between the corresponding circumferentially adjacent pair of the connecting portions 52c suppress radial movement and circumferential movement of the connecting portions 52c. Each circumferentially adjacent pair of the connecting portions are thus prevented from being short-circuited.

Each first support portion 33a does not necessarily have to extend perpendicular to the corresponding second support portions 34a, 35a. That is, as long as the shape of the first support portion 33a and the shape of the second support portion 34a, 35a are different, the first and second support portions 33a, 34a, 35a may be formed in any suitable shapes. In this manner, the first spacing projections 33b and the second spacing projections 34b, 35b are arranged in various portions of the short-circuit member assembly 32. The spacing projections 33b, 34b, 35b thus prevent at least one of radial movement and circumferential movement of the connecting portions 52c.

Either the first spacing members 33 or the second spacing members 34, 35 may be omitted.

The number of the second spacing members may be one or three or more. As the number of the second spacing members becomes greater, the interval between each adjacent pair of the connecting portions 52c is maintained constant more easily. Also, deformation of the short-circuit member assembly 32 is further effectively suppressed.

The first spacing members 33 do not necessarily have to be spaced at equal angular intervals in the circumferential direction. Specifically, the twenty-four first spacing members 33 may be arranged with respect to the short-circuit member assembly 32 in such a manner that some of the intervals between each circumferentially adjacent pair of the first spacing members 33 are smaller (or greater) than the rest.

The number of the first spacing members 33 is not restricted to that of the above embodiment. The first spacing members 33 may be provided by any suitable number, as long as a plurality of first spacing members 33 are provided with respect to the short-circuit member assembly 32. For example, the number of the first spacing members 33 may be set to the number corresponding to (360°/offset angle θ°). Further, the first spacing members 33 are spaced at equal angular intervals in the circumferential direction and the radial length of each support portion 33a is set to a value equal to the radial width L of the range corresponding to the connecting portions 52c. The first spacing projections 33b are each provided at both ends of the corresponding one of the connecting portions 52c, which extend across the support portions 33a. In this manner, at least one of the first spacing projections 33b is located between every adjacent pair of the connecting portions 52c. This suppresses radial movement of every connecting portion 52c.

The punching step may be preceded by the segment forming member forming step. Alternatively, at least one of the punching step, the primary molding step, and the removing step may be carried out simultaneously with the segment forming member forming step.

The cross-sectional shape of the radially outer circumferential end of the upper end surface 36b of the holding portion 36 is not restricted to the arcuate shape but may be, for example, shaped to form a right angle.

Each of the outer terminals 52a and the corresponding one of the outer connecting portions 43 that are held in contact with each other and each of the inner terminals 52b and the corresponding one of the inner connecting portions 46 that are held in contact with each other may be welded together using laser or plasma or through resistance welding, or electrically connected to each other through swaging.

The short-circuit member assembly 32 may be configured by a flat plate-like short-circuit piece group formed by the twenty-four short-circuit pieces 52 that are spaced at equal angular intervals in the circumferential direction. In this case, the amount of the electric current flowing in each short-circuit piece 52 is one third of the total amount of the electric current supplied to the motor portion 11. Thus, each connecting portion 52c is configured in such a manner that the cross-sectional area of the connecting portion 52c in a direction perpendicular to the longitudinal direction is greater than or equal to one third of the cross-sectional area of each conductor forming the coil 24. Alternatively, the short-circuit member assembly 32 may be formed by a plurality of short-circuit piece groups that are stacked together in the direction of the thickness of the short-circuit member assembly 32. For example, if the short-circuit member assembly is formed by two flat plate-like short-circuit piece groups, each group includes twenty-four short-circuit pieces, which are arranged in the circumferential direction in correspondence with the number of the segments 31. Each short-circuit piece includes an outer terminal 52a, an inner terminal 52b, and a connecting portion 52c. The inner terminal 52b is arranged circumferentially offset from the outer terminal 52a at 60° (in other words, in such a manner that the offset angle θ becomes 60°). The connecting portion 52c connects the outer terminal 52a to the inner terminal 52b. The two short-circuit piece groups are stacked together in such a manner that the connecting portions 52c of one of the groups and the connecting portions 52c of the other group face in opposite directions, that is, extend in a mutually crossing manner as viewed in the stacking direction. The outer terminals 52a of one of the groups contact the outer terminals 52a of the other group and the inner terminals 52b of one of the groups contact the inner terminals 52b of the other group. The connecting portions 52c of one of the groups are held in a non-contact state with the connecting portions 52c of the other group. By electrically connecting the outer terminals 52a or the inner terminals 52b with the segments 31, each pair of the segments that are spaced at 120° in the circumferential direction are short-circuited. If the short-circuit member assembly 32 is configured by a plurality of short-circuit piece groups, the spacing members 33 to 35, which are provided with respect to the short-circuit member assembly 32, may be arranged for the respective short-circuit piece groups or the stacked short-circuit piece groups, which is the short-circuit member assembly. Further, the shape of each outer terminal, the shape of each inner terminal, and the shape of each connecting portion is not restricted to the shape of each outer terminal 52a, the shape of each inner terminal 52b, and the shape of each connecting portion 52c of the above embodiment. For example, each connecting portion 52c may be shaped in correspondence with a curve other than an involute curve. The term "flat plate-like short-circuit piece groups" refers to a group of short-circuit pieces each including an outer terminal, an inner terminal, and a connecting portion that are formed in flat-plate like shapes. The "flat plate-like" group of the short-circuit pieces refers to not only the fully flat plate-like group but also a group including a slightly rough portion, a bent portion, or a slightly curved portion in at least one portion of the outer terminal, the inner terminal, and the connecting portion of each short-circuit piece.

Figure 16:
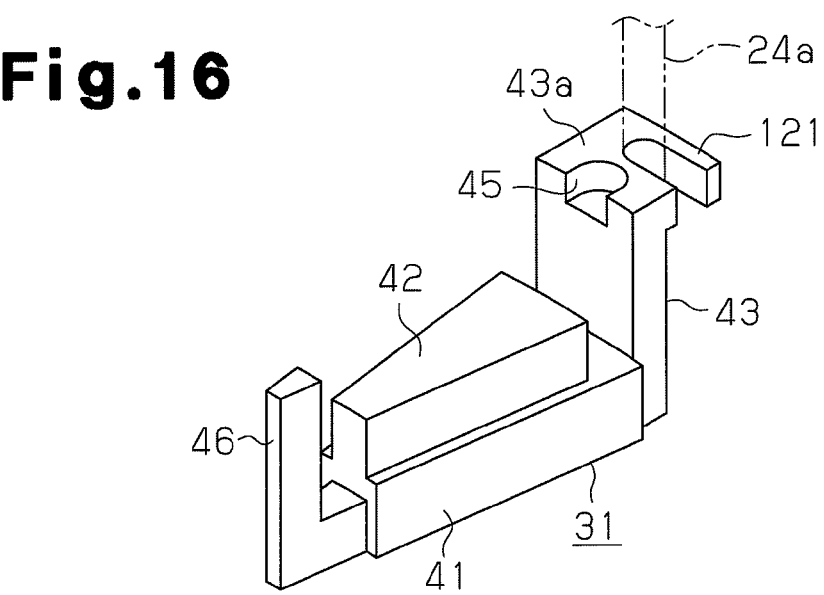
FIG. 16 is a perspective view showing a segment according to a modified embodiment.

Each of the segments 31 may include a connecting claw 121, as shown in FIG. 16. The connecting claw 121 has a bent shape projecting radially from the outer radial end of the connecting brim portion 43a and then extending in a circumferential direction. To connect the terminal 24a of the coil 24 to the connecting claw 121, the terminal 24a is passed between the distal end surface of the connecting brim portion 43a and the connecting claw 121. The connecting claw 121 is then deformed from the radially outer side to carry out fusing (thermal swaging). This also facilitates electrical connection between the terminal 24a and the segment 31.

Figure 17A:
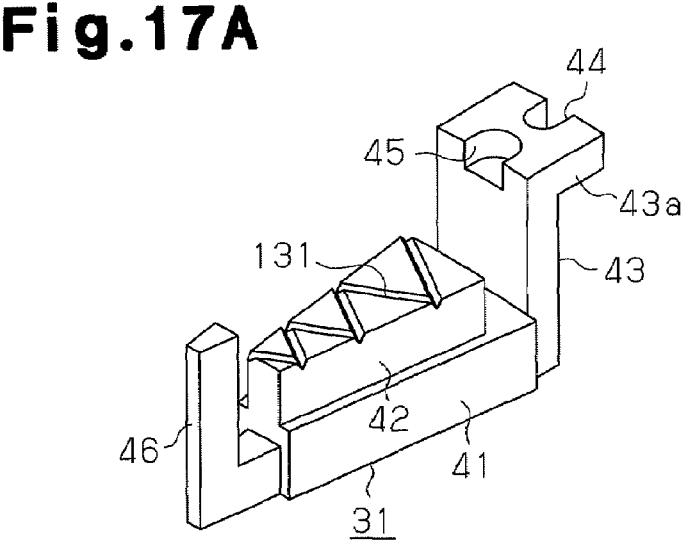
FIG. 17A is a perspective view showing a segment according to another modified embodiment.
Figure 17B:
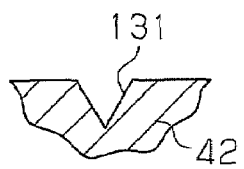
FIG. 17B is a cross-sectional view showing a portion of the segment illustrated in FIG. 17A.

As illustrated in FIG. 17A, an anti-displacement groove 131 may be formed in the distal end surface of the mounting portion 42 of each segment 31. As shown in the drawing, with the segment 31 viewed from above the top surface of the mounting portion 42, the anti-displacement groove 131 has a zigzag shape. A plurality of linear portions that form the anti-displacement groove 131 are radially slanted. Further, as illustrated in FIG. 17B, the anti-displacement groove 131 has a triangular cross section. The insulating resin material forming the holding portion 36 (see FIG. 5A) is received in the anti-displacement groove 131. In this manner, the insulating resin material in the anti-displacement groove 131 suppresses radial movement and circumferential movement of the segments 31 relative to the holding portion 36.

Figure 18A:
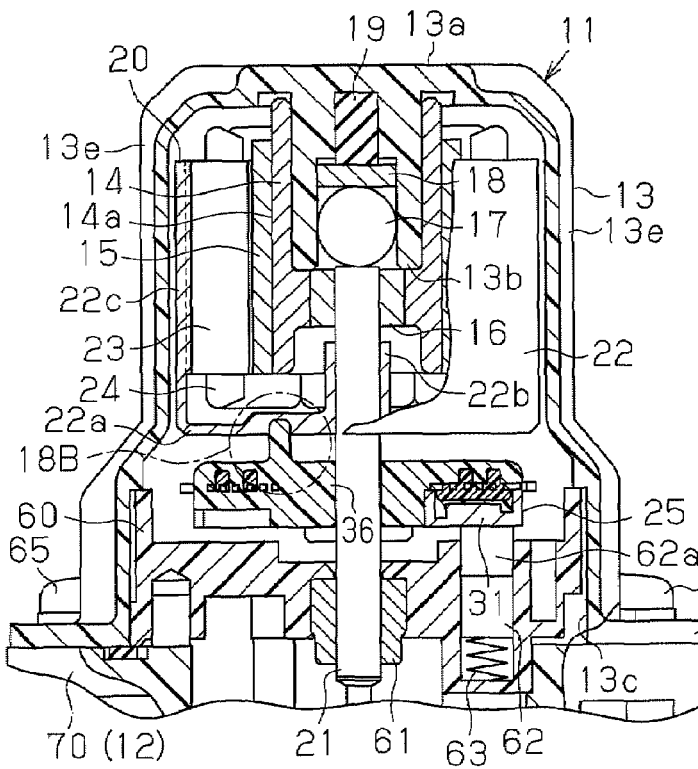
FIG. 18A is a cross-sectional view showing a motor portion according to another modified embodiment.
Figure 18B:
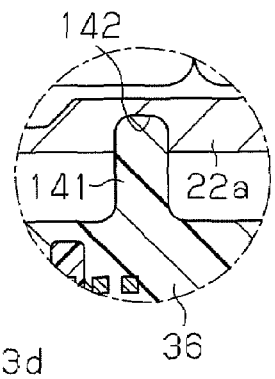
FIG. 18B is an enlarged view showing a portion of the motor portion illustrated in FIG. 18A.

As illustrated in FIGS. 18A and 18B, an engagement projection 141, extending in the axial direction of the rotary shaft 21, may be formed integrally with the surface of the holding portion 36 opposed to the fixing collar 22. An engagement recess 142, with which the engagement projection 141 is engaged, is defined in the bottom 22a of the fixing collar 22. The engagement projection 141 and the engagement recess 142 are located offset from the axis of the rotary shaft 21 by a predetermined distance. To fix the fixing collar 22 and the commutator 25 to the rotary shaft 21, the engagement projection 141 is engaged with the engagement recess 142. This facilitates positioning of the fixing collar 22 and the commutator 25 in the circumferential direction. The terminal 24a of each coil 24 received inside the fixing collar 22 is thus easily connected to the corresponding segment 31. The engagement projections 141 and the engagement recesses 142 may be arranged at a plurality of positions. An equivalent advantage is obtained by arranging the engagement projection 141 in the fixing collar 22 and the engagement recess 142 in the holding portion 36.

Figure 19:
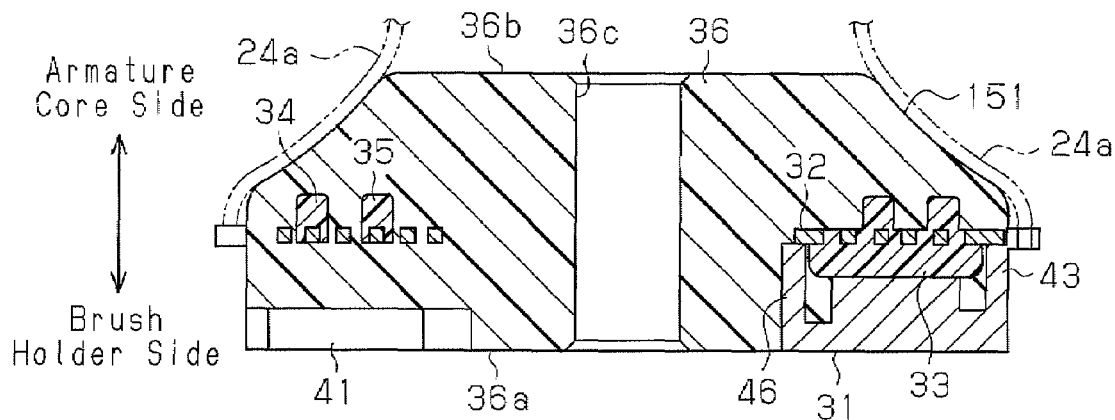
FIG. 19 is a cross-sectional view showing a commutator according to another modified embodiment.

As illustrated in FIG. 19, a guide portion 151 may be provided at the circumferential portion of the end of the holding portion 36 closer to the fixing collar 22. The guide portion 151 is configured in such a manner that the diameter of the holding portion 36 becomes smaller from a substantial center of the holding portion 36 in the direction of the thickness of the holding portion 36 toward the upper end surface 36b. In the cross section of the holding portion 36 along in the radial direction, the guide portion 151 has an inwardly curved shape with respect to the holding portion 36 and each end of the guide portion 151 has an outwardly extending arcuate cross section. The terminal 24a of each coil 24 is thus guided to the outer connecting portion 43 of the corresponding segment 31 by the guide portion 151. In this manner, a break of the terminal 24a by the holding portion 36 is suppressed.

The outer terminals 52a may be exposed to the exterior of the holding portion 36. In this case, the terminals 24a of the coils 24 are connected directly to the outer terminals 52a. Similarly, the terminals 24a of the coils 24 may be connected directly to the inner terminals 52b.

The offset angle θ of each short-circuit piece 52 may be a value other than 120°, as long as the short-circuit piece 52 short-circuits the corresponding segments 31.

Figure 20:
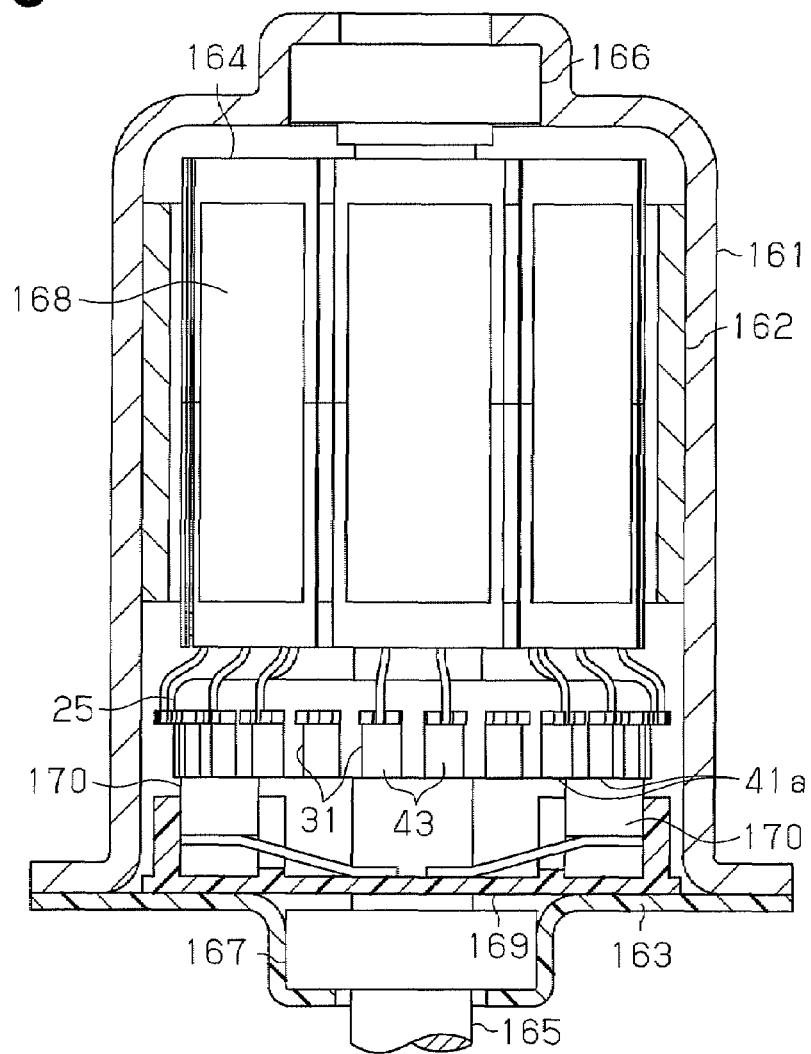
FIG. 20 is a view showing the structure of a motor according to another modified embodiment.

The motor (the motor portion) may be an inner rotor type motor in which an armature core 168 is arranged radially inward from magnets 162. As illustrated in FIG. 20, in the motor, six (only two are shown in the drawing) magnets 162, which are circumferentially arranged, are secured to the inner circumferential surface of a lidded cylindrical yoke housing 161. An end frame 163 is fixed to the walls of the opening of the yoke housing 161. In an armature 164 provided radially inward from the magnets 162, a proximal end (the upper end as viewed in FIG. 20) of a rotary shaft 165 of the armature 164 is supported by a bearing 166 fixed to the center of the bottom of the yoke housing 161. A distal portion of the rotary shaft 165 is supported by a bearing 167 fixed to the center of the end frame 163. The armature core 168 is fixed to a portion close to the proximal end of the rotary shaft 165 to be radially opposed to the magnets 162. Coils (not shown) are wound around the armature core 168. The commutator 25 of the above embodiment is fixed to a portion of the rotary shaft 165 between the armature core 168 and the bearing 167. Also, in this portion, a terminal of each of the coils is electrically connected to the outer connecting portion 43 of the corresponding one of the segments 31. A brush holder 169 is fixed to the surface of the end frame 163 closer to the yoke housing 161. The brush holder 169 includes a feeder brush 170 that slidably contacts the slidable contact surface 41a of the corresponding segment 31. This structure also provides advantages equivalent to those of the above embodiment.

The number of the magnets 15 of the motor portion 11, the number of the teeth 23b, and the number of the segments 31 are not restricted to the corresponding numbers of the above embodiment. It is preferred that the number of the magnets 15 be four or more. The number of the teeth 23b is set in correspondence with the number of the magnets 15. Further, it is preferred that the number of the segments 31 be twelve or more and the least common multiple of the number of the magnets 15 and the number of the teeth 23b.

In the above embodiment, the motor 10 is a motor having a decelerating mechanism configured by joining the motor portion 11 and the decelerating portion 12 as the integral body. However, the motor 10 may be, for example, a motor having an incorporated link mechanism or a motor without a decelerating portion.

The invention claimed is:

1. A commutator comprising:
    a plurality of segments arranged in a circumferential direction, each segment having a slidable contact surface that a feeder brush slidably contacts;

a substantially disk-like short-circuit member assembly having a first end surface and a second end surface that face in opposite directions, the short-circuit member assembly including a group of short-circuit pieces, the group including a plurality of short-circuit pieces that are arranged in a circumferential direction to form a disk-like shape as a whole, each short-circuit piece having an outer terminal, an inner terminal arranged radially inward from the outer terminal and circumferentially offset from the outer terminal at a predetermined offset angle, and a connecting portion connecting the inner terminal to the outer terminal, each of the segments being connected to at least one of the outer terminal and the inner terminal so that each pair of the segments that are to have equal potentials are short-circuited;

a holding portion that covers the segments and at least a portion of the short-circuit member assembly to hold the segments and the short-circuit member assembly, the holding portion being formed of an insulating resin material; and a plurality of spacing members each having an insulated support portion and a plurality of insulated spacing projections formed integrally with the support portion, each support portion extending along the first end surface or the second end surface in a radial direction of the short-circuit member assembly, the spacing projections being arranged in the direction in which the corresponding support portions extend in such a manner that the spacing projections are each provided between the corresponding circumferentially adjacent pair of the connecting portions;

wherein, if the offset angle is represented by $\theta$, the number of the spacing members is at least $(360°/\theta)$, the spacing members being spaced at equal angular intervals in the circumferential direction of the short-circuit member assembly, wherein the length of each support portion in the radial direction of the short-circuit member assembly is equal to the radial width of an annular range corresponding to the connecting portions, and wherein each support portion includes the spacing projections located at both sides of the corresponding connecting portion extending across the support portion.

2. The commutator according to claim 1, wherein each spacing member is formed of an insulating resin material as an integral body with the short-circuit member assembly.

3. A commutator comprising:

a plurality of segments arranged in a circumferential direction, each segment having a slidable contact surface that a feeder brush slidably contacts;

a substantially disk-like short-circuit member assembly having a first end surface and a second end surface that face in opposite directions, the short-circuit member assembly including a group of short-circuit pieces, the group including a plurality of short-circuit pieces that are arranged in a circumferential direction to form a disk-like shape as a whole, each short-circuit piece having an outer terminal, an inner terminal arranged radially inward from the outer terminal and circumferentially offset from the outer terminal at a predetermined offset angle, and a connecting portion connecting the inner terminal to the outer terminal, each of the segments being connected to at least one of the outer terminal and the inner terminal so that each pair of the segments that are to have equal potentials are short-circuited;

a holding portion that covers the segments and at least a portion of the short-circuit member assembly to hold the segments and the short-circuit member assembly, the holding portion being formed of an insulated resin material;

a plurality of spacing members each having an insulated support portion and a plurality of insulated spacing projections formed integrally with the support portion, each support portion extending along the first end surface or the second end surface in a radial direction of the short-circuit member assembly, the spacing projections being arranged in the direction in which the corresponding support portion extend in such a manner that the spacing projections are each provided between the corresponding circumferentially adjacent pair of the connecting portions;

wherein each segment includes an outer connecting portion that is arranged at a radially outer end of the segment and extends in an axial direction of the commutator, and wherein at least one of the support portions contacts a radially inner surface of the outer connecting portion.

4. A direct-current motor comprising:

a plurality of magnets arranged in a circumferential direction;

an armature opposed to the magnets, the armature including a rotary shaft, an armature core fixed to the rotary shaft and having a coil wound around the armature, and the commutator according to claim 1 fixed to the rotary shaft; and a feeder brush that slidably contacts the commutator.

5. A commutator comprising:

a plurality of segments arranged in a circumferential direction, each segment having a slidable contact surface that a feeder brush slidably contacts;

a substantially disk-like short-circuit member assembly having a first end surface and a second end surface that face in opposite directions, the short-circuit member assembly including a group of short-circuit pieces, the group including a plurality of short-circuit pieces that are arranged in a circumferential direction to form a disk-like shape as a whole, each short-circuit piece having an outer terminal, an inner terminal arranged radially inward from the outer terminal and circumferentially offset from the outer terminal at a predetermined offset angle, and a connecting portion connecting the inner terminal to the outer terminal, each of the segments being connected to at least one of the outer terminal and the inner terminal so that each pair of the segments that are to have equal potentials are short-circuited;

a holding portion that covers the segments and at least a portion of the short-circuit member assembly to hold the segments and the short-circuit member assembly, the holding portion being formed of an insulating resin material; and at least one spacing member having an insulated support portion and a plurality of insulated spacing projections formed integrally with the support portion, the support portion extending along the first end surface or the second end surface in a circumferential direction of the short-circuit member assembly, the spacing projections being arranged in the circumferential direction of the short-circuit member assembly in such a manner that the spacing projections are each provided between the corresponding circumferentially adjacent pair of the connecting portions;

wherein each segment includes an outer connecting portion that is arranged at a radially outer end of the segment and extends in an axial direction of the commutator, and wherein at least one of the support portions contacts a radically inner surface of the outer connecting portion.

6. The commutator according to claim 5, wherein the spacing member is one of a plurality of spacing members, and wherein the support portion of each spacing member has an annular shape.

7. The commutator according to claim 5, wherein the spacing member is formed of an insulating resin material as an integral body with the short-circuit member assembly.

8. A direct-current motor comprising:
a plurality of magnets arranged in a circumferential direction;
an armature opposed to the magnets, the armature including a rotary shaft, an armature core fixed to the rotary shaft and having a coil wound around the armature, and the commutator according to claim 5 fixed to the rotary shaft;
and a feeder brush that slidably contacts the commutator.

9. A commutator comprising:
a plurality of segments arranged in a circumferential direction, each segment having a slidable contact surface that a feeder brush slidably contacts;
a substantially disk-like short-circuit member assembly having a first end surface and a second end surface that face in opposite directions, the short-circuit member assembly including a group of short-circuit pieces, the group including a plurality of short-circuit pieces that are arranged in a circumferential direction to form a disk-like shape as a whole, each short-circuit piece having an outer terminal, an inner terminal arranged radially inward from the outer terminal and circumferentially offset from the outer terminal at a predetermined offset angle, and a connecting portion connecting the inner terminal to the outer terminal, each of the segments being connected to at least one of the outer terminal and the inner terminal so that each pair of the segments that are to have equal potentials are short-circuited;
a holding portion that covers the segments and at least a portion of the short-circuit member assembly to hold the segments and the short-circuit member assembly, the holding portion being formed of an insulating resin material;
at least one first spacing member having a first insulated support portion provided on the first end surface and a plurality of first insulated spacing projections formed integrally with the first support portion in such a manner that the first spacing projections are each located between the corresponding circumferentially adjacent pair of the connecting portions; and
at least one second spacing member having a second insulated support portion that is provided on the second end surface and shaped differently from the first support portion and a plurality of second insulated spacing projections formed integrally with the second support portion in such a manner that the second spacing projections are each located between the corresponding circumferentially adjacent pair of the connecting portions.

10. The commutator according to claim 9, wherein the first support portion and the second support portion extend perpendicularly to each other as viewed in the direction of the thickness of the short-circuit member assembly, wherein the first spacing projections are arranged in the direction in which the first support portion extends, and wherein the second spacing projections are arranged in the direction in which the second support portion extends.

11. The commutator according to claim 9, wherein the first support portion extends in a radial direction of the short-circuit member assembly, and wherein the second support portion has an annular shape extending in the circumferential direction of the short-circuit member assembly.

12. The commutator according to claim 9, wherein the spacing member is formed of an insulating resin material as an integral body with the short-circuit member assembly.

13. The commutator according to claim 9, wherein each segment includes an outer connecting portion that is arranged at a radially outer end of the segment and extends in an axial direction of the commutator, and
wherein at least one of the support portions contacts a radically inner surface of the outer connecting portion.

14. A direct-current motor comprising:
a plurality of magnets arranged in a circumferential direction;
an armature opposed to the magnets, the armature including a rotary shaft, an armature core fixed to the rotary shaft and having a coil wound around the armature, and the commutator according to claim 9 fixed to the rotary shaft; and
a feeder brush that slidably contacts the commutator.

15. A direct-current motor comprising:
a plurality of magnets arranged in a circumferential direction;
an armature opposed to the magnets, the armature including a rotary shaft, an armature core fixed to the rotary shaft and having a coil wound around the armature, and the commutator according to claim 3 fixed to the rotary shaft; and
a feeder brush that slidably contacts the commutator.

* * * * *